US012709081B2

(12) United States Patent
Kempnich et al.

(10) Patent No.: US 12,709,081 B2
(45) Date of Patent: Aug. 18, 2026

(54) MACHINES, SYSTEMS, AND METHODS FOR ASSEMBLING PACKAGING CASES

(71) Applicant: Westrock Packaging Systems, LLC, Atlanta, GA (US)

(72) Inventors: Kirk Steven Kempnich, Oviedo, FL (US); Eric Pierce Ward, Orlando, FL (US); Andrew Joshua Bulman, Orlando, FL (US)

(73) Assignee: WestRock Packaging Systems, LLC, Atlanta, GA (US)

( * ) Notice: Subject to any disclaimer, the term of this patent is extended or adjusted under 35 U.S.C. 154(b) by 0 days.

(21) Appl. No.: 18/971,906

(22) Filed: Dec. 6, 2024

(65) Prior Publication Data

US 2026/0131553 A1 May 14, 2026

Related U.S. Application Data

(60) Provisional application No. 63/718,551, filed on Nov. 8, 2024.

(51) Int. Cl.

| | |
|---|---|
| ***B31B 50/80*** | (2017.01) |
| ***B31B 50/07*** | (2017.01) |
| ***B31B 50/52*** | (2017.01) |
| ***B65B 43/10*** | (2006.01) |
| ***B65B 43/18*** | (2006.01) |
| ***B65B 43/26*** | (2006.01) |

(Continued)

(52) U.S. Cl.

CPC ............ *B31B 50/802* (2017.08); *B31B 50/07* (2017.08); *B31B 50/52* (2017.08); *B65B 43/185* (2013.01); *B65B 43/265* (2013.01); *B65B 43/285* (2013.01); *B65B 43/305* (2013.01); *B65B 43/10* (2013.01)

(58) Field of Classification Search

CPC ... B65B 43/265; B65B 43/285; B65B 43/305; B65B 43/10; B65B 43/145; B65B 43/165; B65B 43/185; B31B 50/784; B31B 50/80; B31B 50/802; B31B 50/804; B31B 50/062; B31B 50/07; B31B 50/003

USPC .................................................. 493/309, 313

See application file for complete search history.

(56) References Cited

U.S. PATENT DOCUMENTS 4,793,117 A * 12/1988 Raudat .................. B65B 61/207 53/157

4,807,428 A * 2/1989 Boisseau ................ B65B 5/024 53/247

(Continued)

*Primary Examiner* — Joshua G Kotis

(74) *Attorney, Agent, or Firm* — Neil G. Cohen; Rohini K. Garg

(57) ABSTRACT

Systems, machines and methods for erecting cases or cartons from blanks using robotic arms, which includes a magazine of blanks, a robotic arm, a pair of side belts, an automated change-over in which posts of each robotic arm mate up to points on the magazine and side belts as well as a brake assembly to keep the magazine and side belts in place, and a drive controller to provide driven robotic arm movements. The robotic arms: pick the outermost case from the magazine, erect that case from its blank form, fold down the minor panels or flaps, and place the case as formed in the side belts. The robotic arms may automatically change over the machine, making the necessary adjustments, without direct user intervention, such that there is no manual change-over required when using cases of different size or type.

20 Claims, 23 Drawing Sheets

(51) Int. Cl.

| | |
|---|---|
| ***B65B 43/28*** | (2006.01) |
| ***B65B 43/30*** | (2006.01) |

(56) References Cited

U.S. PATENT DOCUMENTS

| | | | | |
|---|---|---|---|---|
| 5,176,612 | A * | 1/1993 | Calvert | B65H 3/0883 493/317 |
| 5,375,722 | A * | 12/1994 | Leary | B31B 50/00 250/559.46 |
| 5,697,877 | A * | 12/1997 | Roth | B65B 43/265 493/182 |
| 6,915,622 | B2 * | 7/2005 | Spatafora | B65B 43/185 53/381.1 |
| 7,510,517 | B2 * | 3/2009 | Goodman | B31B 50/804 493/317 |
| 9,027,315 | B2 * | 5/2015 | Tsutsumi | B65B 43/305 53/381.1 |
| 11,505,341 | B1 * | 11/2022 | Danner, Jr. | B65B 7/20 |
| 2004/0138039 | A1 * | 7/2004 | Mazurek | B31B 50/802 493/309 |
| 2006/0100081 | A1 * | 5/2006 | Makar | B31B 50/804 493/309 |
| 2006/0117714 | A1 * | 6/2006 | Draghetti | B65B 43/265 53/566 |
| 2007/0293383 | A1 * | 12/2007 | Gebhardt | B31B 50/78 493/313 |
| 2008/0237975 | A1 * | 10/2008 | de Jong | B65H 9/002 271/226 |
| 2008/0300123 | A1 * | 12/2008 | Bonnain | B65B 43/265 493/310 |
| 2009/0247380 | A1 * | 10/2009 | Monti | B65B 43/305 493/315 |
| 2013/0036716 | A1 * | 2/2013 | Tsutsumi | B65B 7/20 53/564 |
| 2013/0040795 | A1 * | 2/2013 | Murano | B31B 50/00 493/53 |
| 2014/0179501 | A1 * | 6/2014 | Akama | B31B 50/262 493/162 |
| 2017/0313465 | A1 * | 11/2017 | Viström | B65D 5/0209 |
| 2018/0126683 | A1 * | 5/2018 | Johnson | B31B 50/046 |
| 2018/0319525 | A1 * | 11/2018 | Langen | B31B 50/022 |
| 2019/0160774 | A1 * | 5/2019 | Langen | B31B 50/0042 |
| 2019/0184671 | A1 * | 6/2019 | Yokota | B65B 43/26 |
| 2020/0406570 | A1 * | 12/2020 | Hirata | B31B 50/07 |
| 2021/0078742 | A1 * | 3/2021 | Hashimoto | B25J 9/06 |
| 2021/0114756 | A1 * | 4/2021 | Fettner | B65B 39/06 |
| 2021/0138755 | A1 * | 5/2021 | Langen | B31B 50/262 |
| 2021/0253287 | A1 * | 8/2021 | Nishio | B65B 43/24 |
| 2022/0355466 | A1 * | 11/2022 | Hashimoto | B25J 15/0616 |
| 2022/0363421 | A1 * | 11/2022 | Horii | B65B 49/08 |
| 2023/0234316 | A1 * | 7/2023 | Burright | B31B 50/80 |
| 2024/0109203 | A1 * | 4/2024 | Yu | B25J 15/0491 |
| 2024/0270430 | A1 * | 8/2024 | Peutl | B65G 65/00 |
| 2025/0206479 | A1 * | 6/2025 | Myers | B65B 5/04 |
| 2025/0353270 | A1 * | 11/2025 | Huang | B31B 50/003 |

* cited by examiner

MACHINES, SYSTEMS, AND METHODS FOR ASSEMBLING PACKAGING CASES

CROSS-REFERENCE TO RELATED APPLICATIONS

This application claims the benefit of U.S. Provisional Application Ser. No. 63/718,551 filed Nov. 8, 2024, the complete disclosure of which is hereby incorporated by reference in its entirety.

FIELD

The present disclosure relates generally to product packaging machines, systems and methods for assembling or forming product packaging and, more particularly, to machines, systems, and methods for automatically assembling or forming cartons or cases for packaging one or more articles, such methods performed by the system and machine including forming cartons or cases from dispensed case blanks.

BACKGROUND

In the field of packaging, a primary product container is often provided with an exterior carton or case. Cartons or cases fabricated from paperboard and/or corrugated paperboard material are often used to store and transport goods. These cartons can include four-sided containers, six-sided containers, eight-sided containers, bulk bins, knockdown cases, and/or various size corrugated barrels. Such cartons or cases are usually formed from blanks of sheet material that are folded along a plurality of preformed fold lines to form an erected container. Moreover, at least some known containers are formed using a machine. In at least some cases, the use of the machine greatly increases a rate at which the containers may be formed and/or filled with goods. Such cartons or cases are desirable for shipping and distribution, for product protection, for tamper resistant security, and for display of product identification or promotional information. It is also desirable that the product seller be able to efficiently package a number of products within a given carton or case. It may also be desirable that the end consumer be able to view product identification or promotional information when the product is displayed for sale. For shipping, product protection and tamper security considerations, it is also desirable to ensure a tight fit of such cartons and for such cartons to have suitable strength for holding and transporting the product. For cost and environmental considerations, it is also desirable for such cartons be formed from as little material as possible and cause as little wastage in the materials as possible. For cost and process considerations, it is also desirable for such cartons to be formed through as simple a set of folding operations as possible to aid in automation of the case erection and loading process. Accordingly, those skilled in the art continue with research and development efforts in the field of product packaging, including machines for forming or assembling cases or cartons.

Known systems, machines and methods suffer from certain disadvantages in the erection of certain types of cartons. For example, carton erection throughput is lower than desired, sealing difficulties are presented, and limitations are provided regarding ability to efficiently and reliably erect different sized cartons from different case blanks.

SUMMARY

The present disclosure includes examples of product packaging systems, machines for erecting cases or cartons using robotic arms, and methods of erecting cases using such machines from blanks for forming the cases. The following is a non-exhaustive list of examples, which may or may not be claimed, of the subject matter according to the present disclosure.

One purpose of the present invention is to erect a knock-down style case utilizing robotic arms. The robotic arms also perform necessary change-over adjustments for the machine when different sizes, styles, or types of cases are desired to be formed, or when different products are to be packaged therein.

In an example, the disclosed packaging system includes a magazine of blanks, a robotic arm, a pair of side belts, an automated change-over in which posts of each robotic arm mate up to points on the magazine and side belts as well as a brake assembly to keep the magazine and side belts in place, and a drive controller to provide driven robotic arm movements. The carton or case includes a longitudinal axis, a first end, a second end opposite the first end along the longitudinal axis that is closable, and a plurality of panels that form an interior volume. One or more articles may be loaded or held within the interior volume of the carton or case and at least partially surrounded by the plurality of panels. The one or more articles may be inserted into the interior volume and removed from the interior volume through the first end or the carton or case may be formed to wrap around the one or more articles. The second end may be closable in response to insertion of the article into the interior volume or may be closed prior to insertion of the one or more articles. The one or more articles are retained within the interior volume by the second end.

In an example, the disclosed method includes process steps of: (1) providing a blank that includes a plurality of panels; (2) dispensing the blank from a holder of blanks; (3) manipulating the blank such that the panels form a carton or crate including a longitudinal axis, a first end, a second end that is opposite the first end along the longitudinal axis, and an interior volume; (4) squaring the panels of the carton or crate to form a substantially rectangular interior volume; and, optionally, (5) inserting an article or other carton within the interior volume such that at least a portion of the article is surrounded by the panels; (6) enclosing each end of the case in response to inserting the article.

Other examples of the disclosed carton, blank, packaging system, and methods will become apparent from the following detailed description, the accompanying drawings, and the appended claims.

BRIEF DESCRIPTION OF THE DRAWINGS

Non-limiting and non-exhaustive examples are described with reference to the following Figures, wherein like reference numerals refer to like parts throughout the various drawings unless otherwise specified.

FIGS. 1A-1F show a perspective view of an example sequence of operation of a product packaging machine and system according to the present disclosure, wherein FIG. 1A shows a product packing machine operating to process a first erected carton while simultaneously picking a first panel of a folded case blank from a magazine of blanks in a first stage of erecting a second carton with a first robotic arm;

FIG. 1B shows the product packing machine operating to partially eject the first erected carton and a simultaneous unfolding of the folded case blank of the second case as it is removed from the magazine by the first robotic arm in a second stage of erecting the second carton;

FIG. 1C shows the product packing machine operating to further eject the first erected carton and a further unfolding of the folded case blank with assistance of a second robotic arm picking a second panel of the folded case blank opposite the first panel picked by the first robotic arm in a third stage of erecting the second carton;

FIG. 1D shows the product packing machine operating to further eject the first erected carton and the first and second robotic arms placing the unfolded second blank on side belts while folding a trailing end flap of the case blank in a fourth stage of erecting the second carton;

FIG. 1E shows the product packing machine operating to fold a leading end flap of the case blank and to fold longitudinal panel flaps of the unfolded case blank in a fifth stage of erecting the second carton after the first and second robotic arms have released the unfolded blank; and FIG. 1F shows the product packing machine operating to square the unfolded case blank with the side belts while the first robotic arm returns to pick a third folded case blank from the magazine.

DETAILED DESCRIPTION

Referring to the figures, by way of examples, the present disclosure is directed to a packaging machine for erecting a carton from a blank. The machine and system include several main components or subsystems, with each discussed in more detail herein: a magazine, a robotic arm or pair of robotic arms, a pair of side belts, a recipe-driven robotic change-over, and equation-driven robotic movements. Method aspects will be in part apparent and in part explicitly described in the following description.

The following are examples of the product packaging machine and systems, according to the present disclosure. Examples of the system and machine include a number of elements, features, and components. All of the elements, features, and/or components described or illustrated in one example are not necessarily required, however, in each example. Some or all of the elements, features, and/or components described or illustrated in one example can be combined with other examples in various ways without the need to include other elements, features, and/or components described in those other examples, even though such combination or combinations are not explicitly described or illustrated by example herein.

Figure 13:
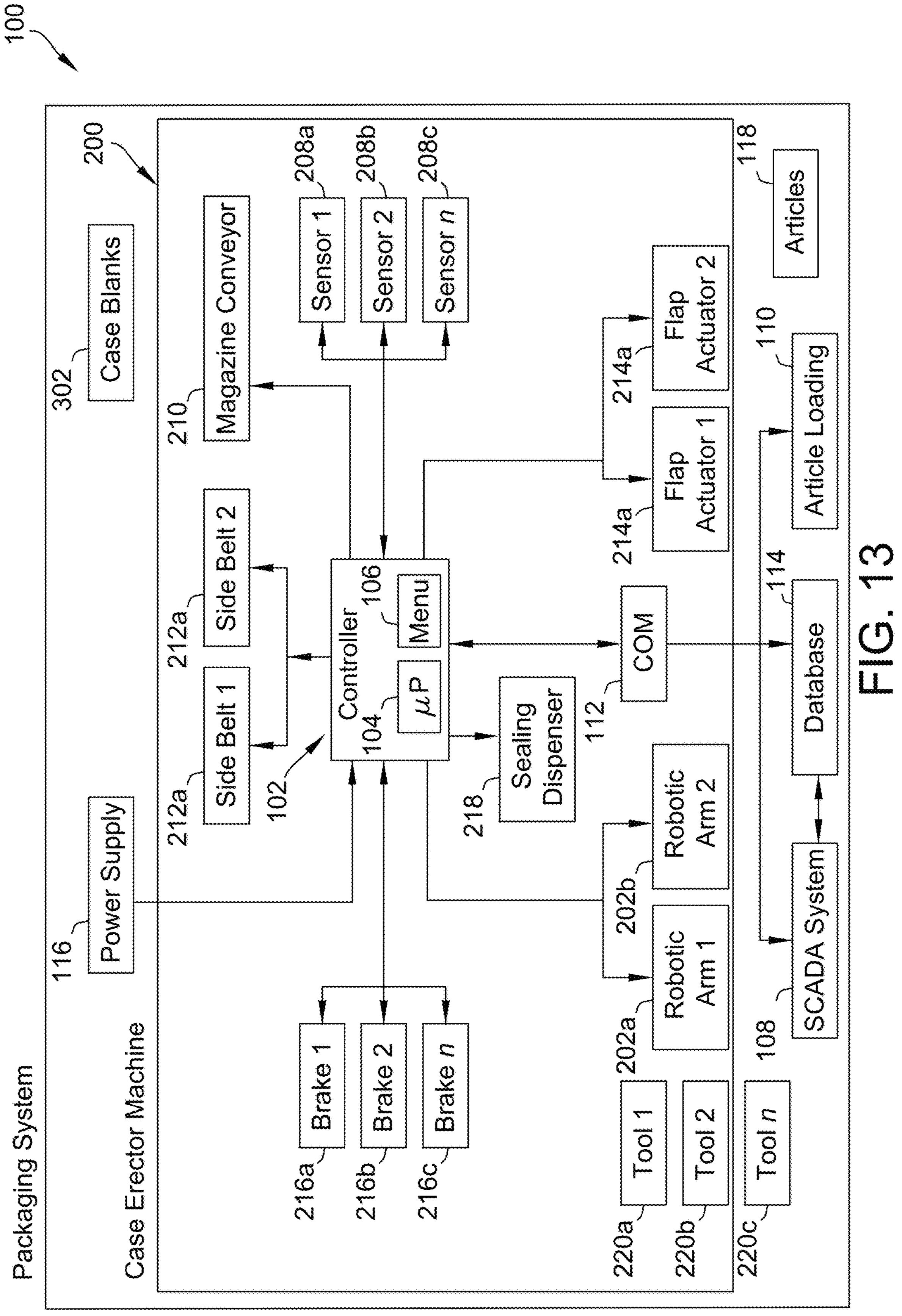
FIG. 13 is a case erector machine and system control schematic according to an example of the present disclosure.
Figure 14:
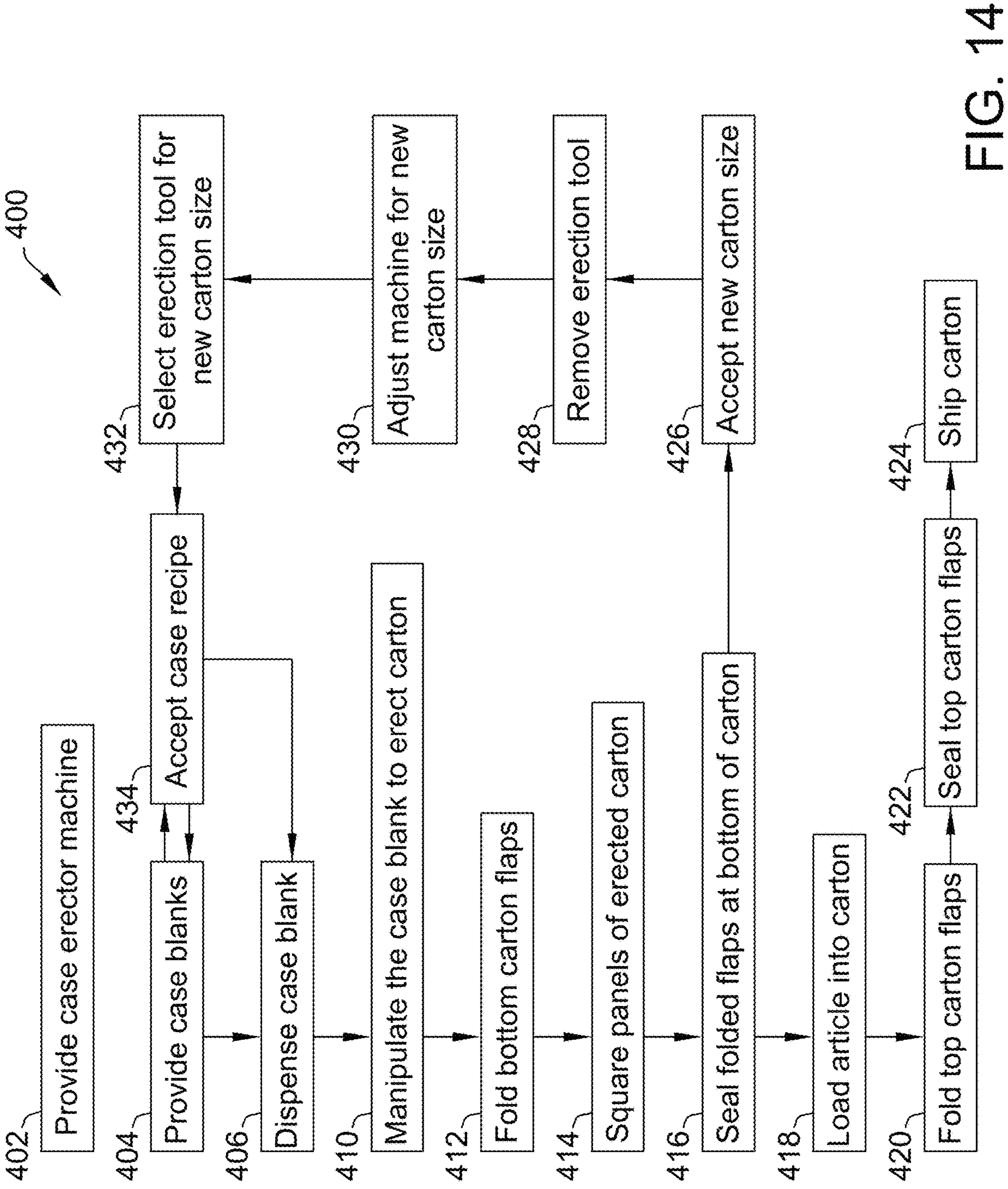
FIG. 14 is an algorithmic method flowchart of exemplary processes executable in the example machine and system according to the present disclosure.

Generally, examples of a product packaging system 100 (FIGS. 1A through 1F and 9-13) are disclosed herein including a case erection machine 200 that includes or takes the form of robotic arms 202*a*, 202*b* operative on and within a frame 204 for erecting cartons 300 from folded case blanks 302 held in a magazine 206 coupled to one end of the frame 204. Detailed partial views of machine features are shown in FIGS. 2A, 2B, 3A, 3B, 4, 5, 6A, 6B, 7A, 7B, 8A, 8B, 8C including desirable features for realizing some of the beneficial functionality described. The system 100 and machine 200 are shown schematically in FIG. 13, and processes implemented by the system 100 and machine 200 are illustrated in FIG. 14.

In contemplated embodiments the system 100 includes the case erector machine 200 (FIGS. 1A through 1F and 9-12), and a controller 102 (FIG. 13) responsive to various sensors 208*a*, 208*b*, 208*c* (FIG. 13) distributed throughout the machine structure to automatically operate and control various actuators and components distributed throughout the machine to realize the case erector functionality and processes 400 (FIG. 14) described herein via the robotic arms 202*a*, 202*b* and machine actuators such as a magazine conveyor 210, side belts 212*a* and 212*b*, carton flap folding actuators 214*a*, 214*b*, brake assemblies 216*a*, 216*b* and 216*c* and a sealing dispenser 218 as further described below. The system 100 also includes a number of folded case blanks 302 (FIGS. 1A through 1F, 2A, 2B, 3A) which may be separately formed and fabricated and fed to the magazine 206 (FIGS. 3A, 3B) of the machine 200 while it is continuously operating. The system 100 also includes a variety of erecting tools 220*a*, 220*b*, 220*c* which may be provided for selective use by the machine in operation thereof, as well as accessories, communication and reporting elements regarding system status, and operator interface and display components that may be beneficially provided for machine oversight.

In contemplated examples, the controller 102 may include one or more processor-based control devices operably connected to sensors and actuators on the machine as shown. As used herein, the term "processor-based" shall refer not only to controller devices including a processor or microprocessor 104 and memory 106, but also to other equivalent elements such as microcomputers, programmable logic controllers, reduced instruction set (RISC) circuits, application specific integrated circuits and other programmable circuits, logic circuits, equivalents thereof, and any other circuit or processor capable of executing the functions described below. The memory 106 may include instructions and data to implement control routines and the functionality described herein via applicable formulas, sometimes referred to as recipes for erecting the cartons of various different sizes as further described herein.

The processor-based devices listed above are exemplary only, and are thus not intended to limit in any way the definition and/or meaning of the term "processor-based". In some examples, the controller 102 may be embedded or integrated into the design of the machine 200 and provided as a unit attached to the machine frame 204, or in other examples the controller 102 may be remotely located from the machine but otherwise in communication with the machine 200 such as, for example, a centralized Supervisory Control and Data Acquisition (SCADA) system 108 monitoring aspects of an industrial facility and processes as those in the art may appreciate, including but not limited other machinery for loading articles 118 into erected cartons. Accordingly, the system 100 also includes a communications element 112 configured to transmit data and information in a wired or wireless manner for data collection, monitoring and oversight of the machine operation to any desired recipient device (e.g., the SCADA system 108) which may be remotely located from the machine.

One or more system databases 114 may also be provided for storage and retrieval of data, information and algorithms for executing movement of the robotic arms and automated change-over routines described further below wherein the machine is self-configuring to erect different sizes of cartons. A set of tools 220*a*, 220*b*, 220*c* is contemplated in some examples for use by the robotic arms 202*a*, 202*b* to perform automated change-over routines so that cartons of different sizes may be erected by the robotic arms 202*a*, 202*b*. In addition to selecting optimal tools for erecting different cartons, the robotic arms 202*a*, 202*b* may also automatically adjust components and assemblies in the machine to accommodate case blanks of different sizes to erect cartons of different sizes with otherwise similar case erection functionality. That is, the machine 200 is universally operable with differently sized case blanks 302 to erect cartons of different length, width, and depth to accordingly package different sizes of articles therein. Instructions for automatically undertaking the machine adjustments for use with differently sized case blanks may be provided to and implemented by the controller 102, as well as unique recipes or formulas for movement of the robotic arms to optimally erect cases of different size.

A mains power supply 116 is operably connected to controller 102 and to the machine actuators. The power supply 116 may include electrical power and pneumatic air supply components and actuators in contemplated examples. Additional types of power supplies (e.g., hydraulic power supplies) are possible in further and/or alternative examples.

Finally, the system 100 includes a number of articles 118 to be packaged in the cartons that are processed by the machine 200. The articles 118 may include any desired article that is desirably shipped within a carton. More than one article 118 may be loaded in the same carton 300 via article loading equipment 110 in a conventional manner. In some example, one or more articles may be loaded using partly or wholly manual loading packaging steps performed by a human person in combination with automatically performed packaging steps.

As best shown in FIGS. 1A through 1D a carton 300 has been erected in the machine 200 from a folded case blank 302 by the robotic arms 202*a*, 202*b*. The carton 300 defines a three-dimensional body having a longitudinal length dimension L along a horizontal x axis of a Cartesian coordinate system which also coincides with a longitudinal dimension of the machine 200, a lateral width dimension W measured along a horizontal y axis the Cartesian coordinate system that coincides with a lateral width dimension of the machine 200, and a height dimension H measured along a z axis of the Cartesian coordinate system that coincides with a vertical dimension of the machine 200. The length, width and height dimensions of the carton 300 may vary in other examples wherein one or more of the length, width or height dimension is increased or decreased. In the illustrated example, the carton 300 is elongated in the length dimension (i.e., the length dimension is greater than the width dimension and the height dimension) although in other examples the carton 300 may likewise be elongated in the lateral direction or the height direction instead. In still other examples the carton 300 need not be elongated and may have longitudinal and lateral dimensions that are about equal to one another, with a height dimension being the same or different from the longitudinal and lateral dimensions.

The carton 300 is introduced to the machine 200 via the magazine 206 in the form of a case blank 302, and the carton 300 is erected and conveyed through the machine 200 in a direction away from the magazine 206, while another case blank 302 is being retrieved from the magazine 206 in a folded, generally planar form while the processing of the carton 300 is completed. Cartons 300 may be erected continuously in combination with one another in an automated manner as shown in FIGS. 1A through 1F. As illustrated in the figures, in one or more examples, the erected carton 300 includes a longitudinal axis 304. The carton 300 includes a first end 306 (FIG. 1A) and a second end 308 (FIG. 1B) that is opposite the first end 306 along the longitudinal axis 304. The carton 300 includes a plurality of panels 310 (FIG. 1C) that form an interior volume 312 of the carton 300. The interior volume 312 is configured to receive an article 118. The first end 306 is open for inserting the article 118 into the interior volume 312 and removing the article 118 from the interior volume 312. Either or both of the first end 306 and the second end 308 is configured to close in response to inserting the article 118 for retaining the article 118 within the interior volume 312 The plurality of panels 310 extend around the longitudinal axis 304 and form the interior volume 312 of the case 300.

In one or more examples, the folded case blanks 302 (FIGS. 2A, 2*b*, 3A, 4) are fabricated from, for example, paperboard and/or corrugated paperboard material. In folded configuration, each case blank 302 includes a first side 320 and a second side 322 (FIG. 4) opposing the first side 320. The first side 320 includes a joined first side panel 324*a* and a first end panel 326*a* with a fold line therebetween. The second side 322 also includes a joined second side pane 324*b* and a second end panel 326*b* a with a fold line therebetween. The first side panel 324*a* is further joined to the second end panel 326*b* and the second side panel 324*b* is joined to the first end panel such 326*a* with fold lines. As such, in the folded state, the first and second sides 320 and 322 are mirror images of one another with the side and end panels being reversed relative to one another on the left or right edges of each side 320, 322. Either side 320, 322 of the folded case blanks 302 can be loaded in the magazine 206 of the machine 200 and the robotic arms 202*a*, 202*b* are operable to erect cartons from the blank in so-called left-hand and right-hand configurations of the case blanks 302.

When unfolded, the side panels 324*a*, 324*b* and the end panels 326*a*, 326*b* may form and define a continuous three-dimensional and orthogonal wall structure defining the interior volume 312 of the erected carton 300. When folded, however, the case blanks 302 are substantially planar and stackable in a compact form such that the magazine 206 may be loaded with any desired number of case blanks 302 for a continuous operation of the machine 200. As the case blanks 302 in the magazine 206 are dispensed to deplete the supply of case blanks 302, the magazine 206 may be re-loaded with additional folded case blanks 302 while the machine 200 continues to operate and erect the cartons from case blanks 302 previously loaded in the magazine 206.

In the example shown, the side panels 324*a*, 324*b* in each case blank 302 include respective foldable flap panels 328*a*, 328*b* below the side panels 324*a*, 324*b* and foldable flap panels 330*a*, 330*b* above the side panels 324*a*, 324*b*. The end panels 326*a*, 326*b* in each case blank 302 likewise include respective foldable flap panels 332*a*, 332*b* below the end panels 326*a*, 326*b* and foldable flap panels 334*a*, 334*b* above the end panels 326*a*, 326*b*. The foldable flap panels 328*a*, 328*b*, 330*a*, 330*b*, 332*a*, 332*b*, 334*a*, 334*b* are closable and sealable to contain the article 118 in the erected carton 300 with each foldable flap extending in a generally perpendicular relation to the respective side panels or end panels from which they depend. The configuration of the illustrated case blank 302 including the upper foldable flap panels 330*a*, 330*b*, 334*a*, 334*b* is sometimes referred to as a Regular Slotted Case (RSC) configuration. In another example, however, the upper foldable flap panels 330*a*, 330*b*, 334*a*, 334*b* may be considered optional and need not be provided. Such a case blank wherein the foldable flap panels 330*a*, 330*b*, 334*a*, 334*b* are omitted is sometimes referred to as a Half Slotted Case (HSC) configuration. The system, machine and methods described apply equally to such RSC and HSC configurations, as well as other possible carton configurations that include foldable flap panels only on the bottom side of the carton.

In relation to the example shown in FIGS. 1A-1F, the foldable flap panels include longitudinally extending major flap panels 328*a*, 328*b* extending from the first and second side panels 324*a*, 324*b* and minor flap panels 332*a*, 332*b* extending transversely to the longitudinal axis 304. The major flap panels 328*a*, 328*b* and the minor flap panels 332*a*, 332*b* correspond to major and minor dimensions of the elongated carton 300 when unfolded. Case blanks 302 having side panels 324*a*, 324*b* and end panels 326*a*, 326*b* of equal length may be erected in the machine 200 and system 100.

Further, for purposes of the present description and following the example of an elongated case the minor flap panels 332*a*, 332*b* are designated herein as a leading minor flap 332*a* and a trailing minor flap 332*b* in reference to a direction through which erected cases are conveyed through the machine 200. In FIGS. 1A through 1F the cases are conveyed horizontally from the right-hand end of the machine 200 to the left-hand end of the machine 200, so the trailing minor 332*b* flap is the one on the right-hand side of the carton 300 and the leading minor flap 332*b* is the one on the left hand side of the carton 300 in the illustrated FIGS. 1A through 1F as the carton 300 is being erected.

In contemplated embodiments, and as demonstrated in FIGS. 1A through 1F, in the erection of the case blank 302 in the operation of the machine 200 the side panels 324*a*, 324*b* are first unfolded and separated by the robotic arms 202*a*, 202*b*, inherently causing the end panels 236*a*, 326*b* to unfold and separate at the same time. The trailing minor flap 332*b* on the bottom side of the carton 300 is then folded first, followed by the leading minor flap 332*a* and the major flaps 328*a*, 328*b* over the previously folded trailing and leading minor flaps 332*b*, 332*a*. For non-elongated cases, the sequence of the carton erection is similar, namely that the side panels are first unfolded and separated, the trailing minor flap on the bottom side of the case is folded next, followed by the folding leading minor flap and the remaining flaps over the leading and trailing minor flaps.

Figure 1A:
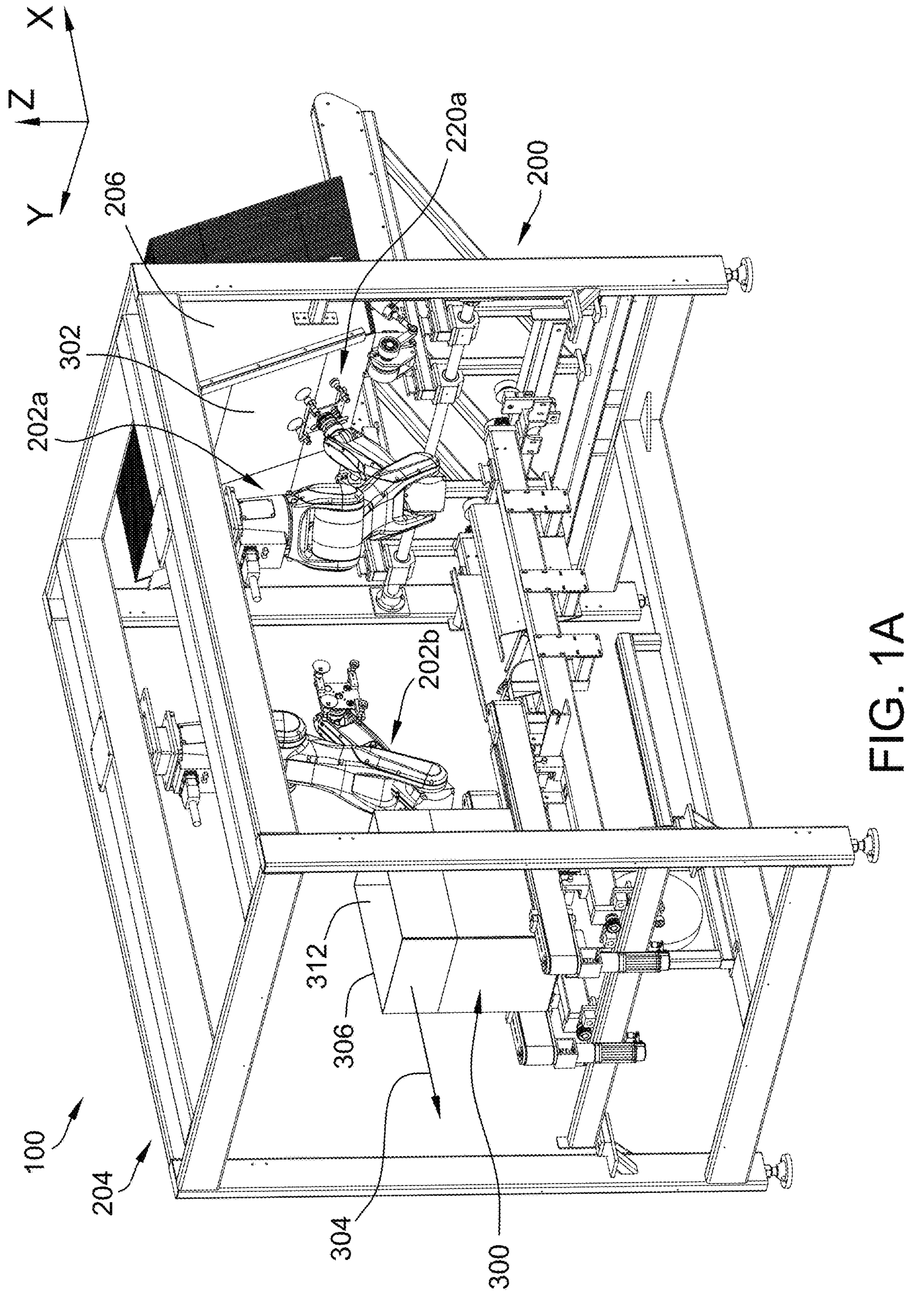

FIG. 1A shows the machine 200 operating to process a first erected carton 300 while simultaneously picking a folded case blank 302 from the magazine 206 in a first stage of erecting a second carton with the first robotic arm 202*a*. In the first stage, the first robot arm 202*a* includes a first erecting tool 220*a* having vacuum cups that are engaged and attached to first and second panels of the case blank 302 on the leading edge of the magazine 206. The second robotic arm 202*b* includes a second tool 220*a* with vacuum cups as well, and the tool 220*a* of the second robotic arm 202*b* is oriented angularly with respect to the tool 220*a* of the first robotic arm 202*a* and in a position spaced apart from the case blank 302. As such, only the first robotic arm 202*a* engages the case blank 302 in the first stage. While the second carton is in the first stage, the first carton 300 is nearly complete, and as depicted in FIG. 1A the first carton 300 is nearly through the sixth stage of case erection as described below.

Figure 1B:
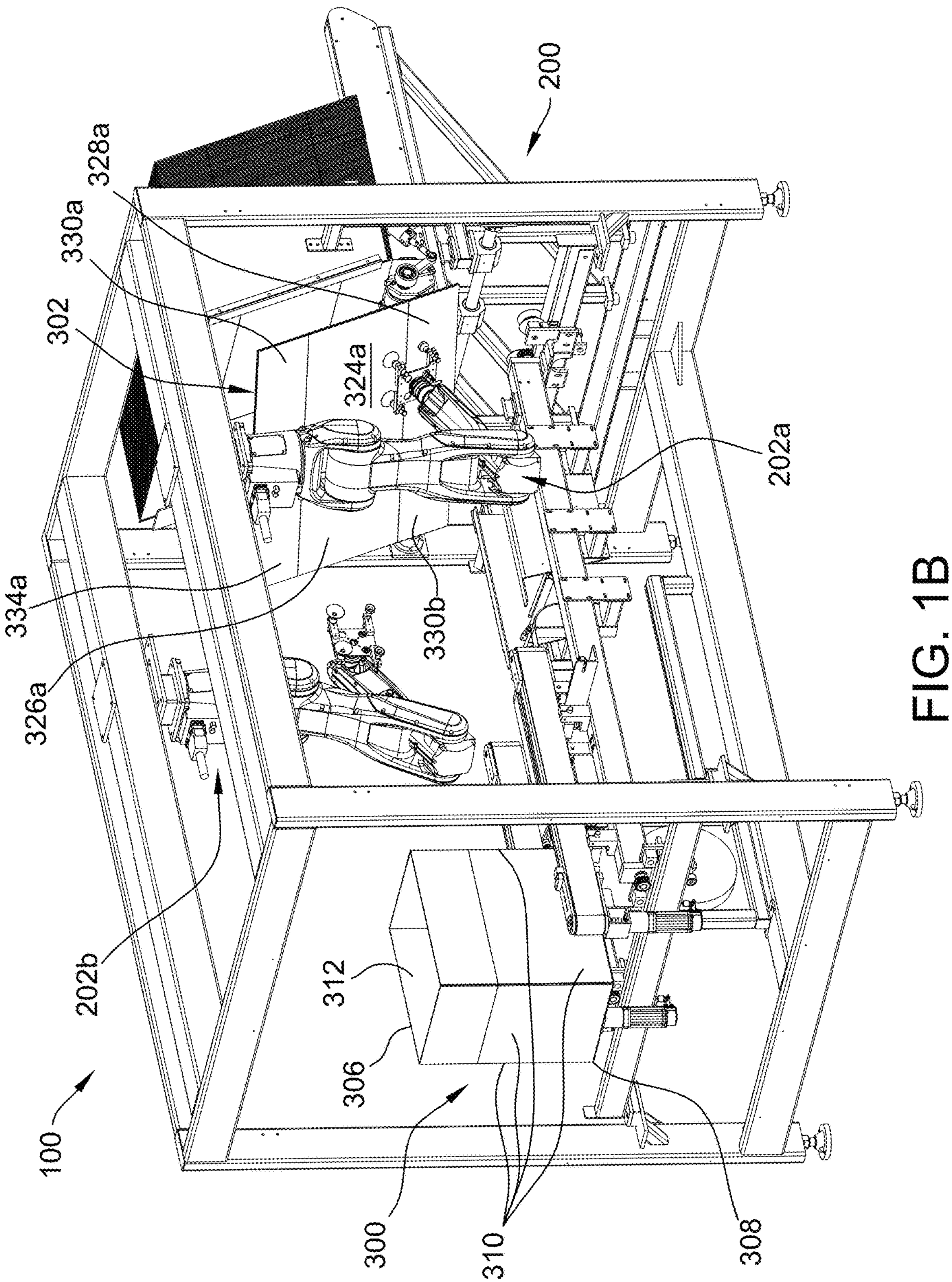

FIG. 1B shows the machine 200 operating to partially eject the first fully erected carton 300 and a simultaneous unfolding of the folded case blank 302 of the second carton as the case blank is removed from the magazine by the first robotic arm 202*a* in a second stage of erecting the second carton. The tool 220*a* of the first robotic arm is attached as shown in part to the side panel 324*a* and in part to the major flap 328 via the vacuum cups provided. As shown in FIG. 1B, the robotic arm 202*a* has pulled a portion of the case blank 302 away from the magazine 206. As the case blank 302 is being pulled away from the magazine 206, the panels on the opposing side of the blank 302 and the case blank 302 begin to unfold. In the second stage, the first robot 202*a* only is engaged to the case blank 302. The second robotic arm 202*b* remains disengaged from the case blank 302 in the second stage, although the tool 220*a* of the second robotic arm 202*b* is angularly positioned to engage corresponding panels of the opposite side of the case blank 302, also via vacuum cups, once the case blank 302 is sufficiently unfolded.

Figure 1C:
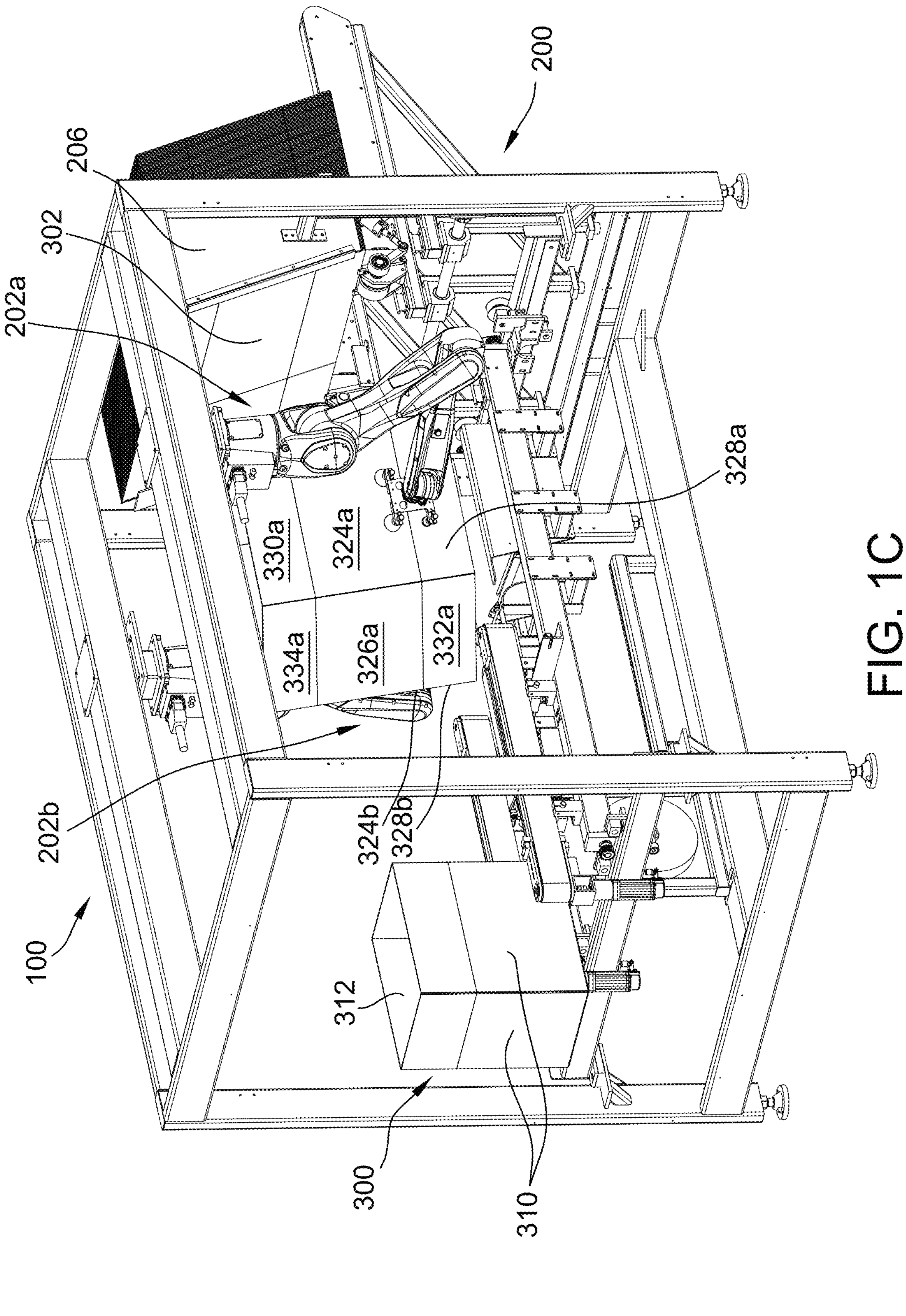

FIG. 1C shows the machine 200 operating to further eject the first fully erected carton 300 and a further unfolding of the case blank 302 with assistance of the second robotic arm 202*b* which is now attached to the side panel 324*b* and the major flap panel 328*b* of the case blank 302 via the suction cups provided. The second robotic arm 202*b* engages the panels 342*b*, 328*b* opposite to the first robotic arm 202*a* in a third stage of erecting the second carton, and the two robot arms 202*a*, 202*b* now work in combination to unfold the case blank 302 by pulling the side panels 324*a*, 324*b* apart and separating them from one another to roughly realize the three-dimensional shape of the carton 300. Additionally, the major flaps 328*a*, 328*b* are maintained in a generally coplanar relationship with the side panels 324*a*, 324*b* by the robotic arms 202*a*, 202*b*. The tools 220*a*, 220*b* of the first and second robotic arms 202*a*, 202*b* are contemplated to be identical to one another in some examples, although they could be different in other examples.

Figure 1D:
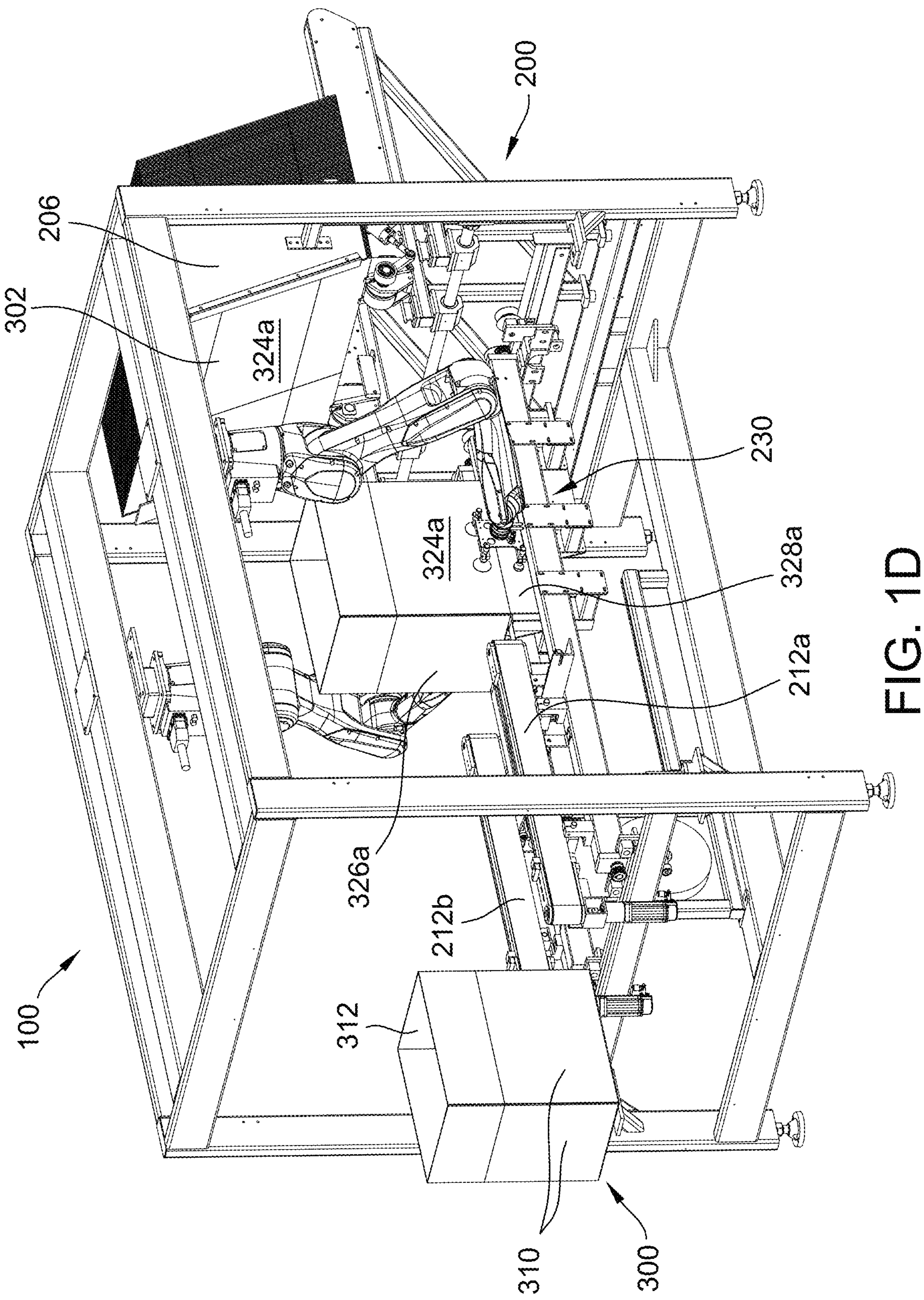

FIG. 1D shows the machine 200 operating to further eject the first fully erected carton 300 and the first and second robotic arms 202*a*, 202*b* placing the unfolded case blank 302 on a rail assembly 230 in a fourth stage of erecting the second carton 300. In the fourth stage, the trailing minor flap 332*b* of the second case blank is first caused to fold beneath and between the side panels 324*a*, 324*b* as contact is made with the rail assembly 230. In a contemplated example, the folding of the trailing minor flap 332*b* is accomplished via the robotic arms 202*a*, 202*b* orienting the second case blank at slight angle to the rail assembly such that when the case blank is lowered to the rail assembly 230 the leading edge of the trailing minor flap 332*b* contacts the rail assembly 230 and is naturally folded beneath the carton as the remainder of the carton is lowered and brought to a level position on the rail assembly 230. As such, the folding of the trailing minor flap 332*b* is realized solely via the movement of the robotic arms 202*a*, 202*b* as contact is made with the rail assembly 230, and as such an independent folding structure and/or independent folding actuator is not required in the rail assembly 230 or elsewhere on the machine to fold the trailing minor flap 332*b*. In another example, however, the trailing minor flap 332 may be folded with assistance of a structure or actuator of the machine that is separately provided from the robotic arms 202*a*, 202*b*.

Unlike the trailing minor flap 332*b*, the leading minor flap 332*a* and the major flaps 328*a*, 328*b* are not folded, however, when the second case blank 302 is initially placed on the side rail assembly 230 by the first and second robotic arms 202*a*, 202*b*. In the fourth stage, at least one of the robot arms 202*a*, 202*b* moves the case blank 302 forward on the rails, causing the leading minor flap 332 to fold against a static plow structure of the rail assembly 230. As this happens, the case blank 302 is moved forward toward first and second side belts 212*a*, 212*b* which are mounted on the rail assembly 230. Forward movement of the second case blank causes the leading minor flap 332*a* to fold against a static structure in the machine beneath the side panels and the leading edge panel of the second case blank. Static cylinders (FIG. 6A) are provided on the machine 200 to keep the trailing minor flap from unfolding as this happens. One or more actuators 214*a*, 214*b* are operable to fold the major flaps 328*a*, 328*b* at the bottom of the second case blank 302 over the previously folded minor flaps 332*a*, 332*b*. In some examples, the major flaps 328*a*, 328*b* could be folded by a single actuator.

Figure 1E:
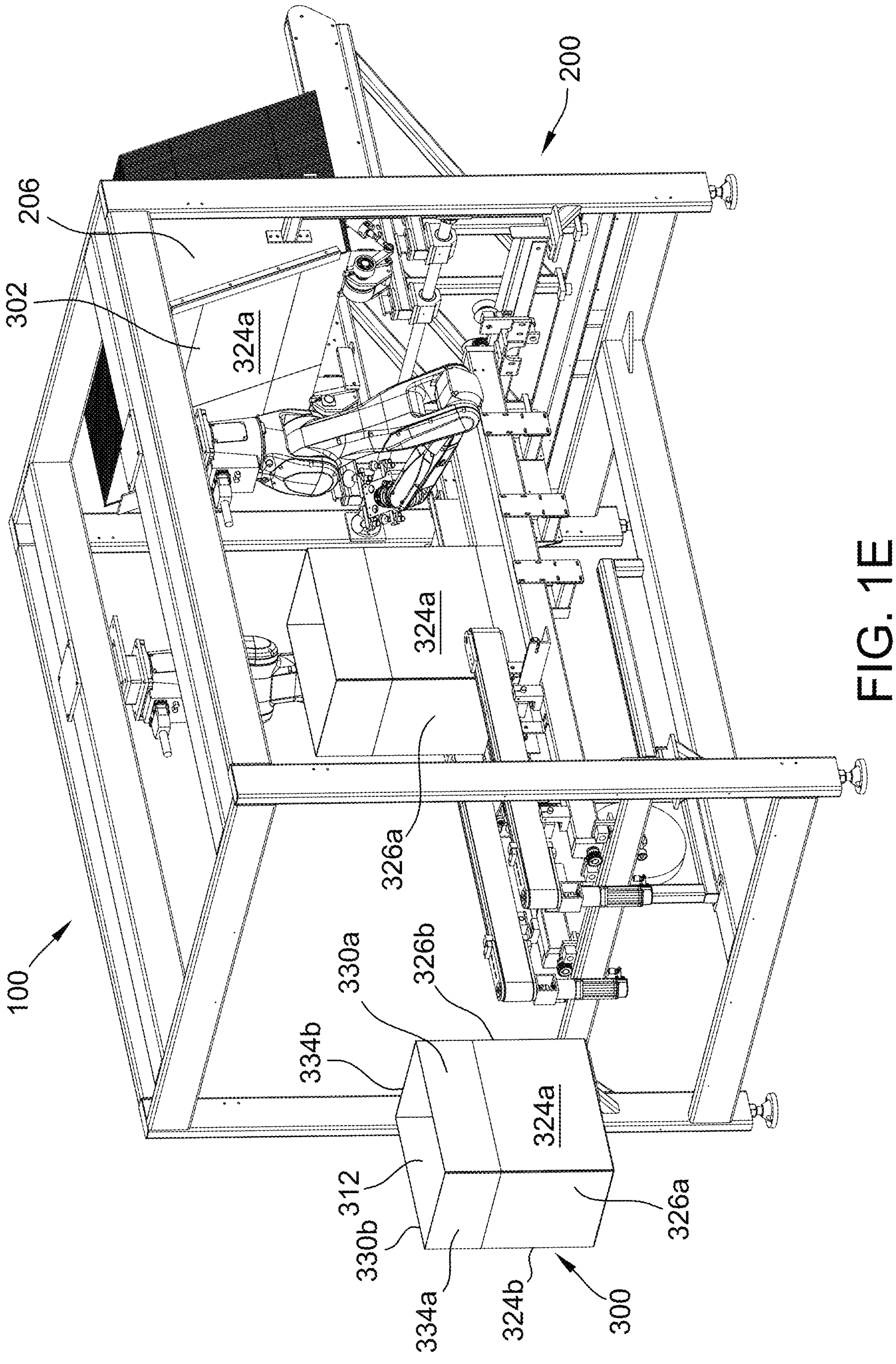

FIG. 1E shows the machine 200 operating in a fifth stage of erecting the second case blank 302 after the first and second robotic arms 202*a*, 202*b* have released the second case blank 302. In the fifth stage, side belts 212*a*, 212*b* respectively engage the side panels 324*a*, 324*b* of the second case blank 302 and propel the second case blank 302 forward (i.e., to the left in FIG. 1E) and away from the points of release of the first and second robotic arms 202*a*, 202*b*.

In a contemplated example, once the case blank 302 is placed on the rail assembly 230 the first robotic arm 202*a* releases first from the case blank 302 and begins to return to the magazine 206 to pick another case blank 302, while the second robotic arm 202*b* remains engaged to push the case blank 302 forward to complete the folding of the flaps beneath the carton and to engage the carton with the side belts 212*a*, 212*b*. The second robotic arm 202*b* may then release from the carton and return to assist the first robotic arm 202*a* in unfolding the next case blank 302.

Figure 1F:
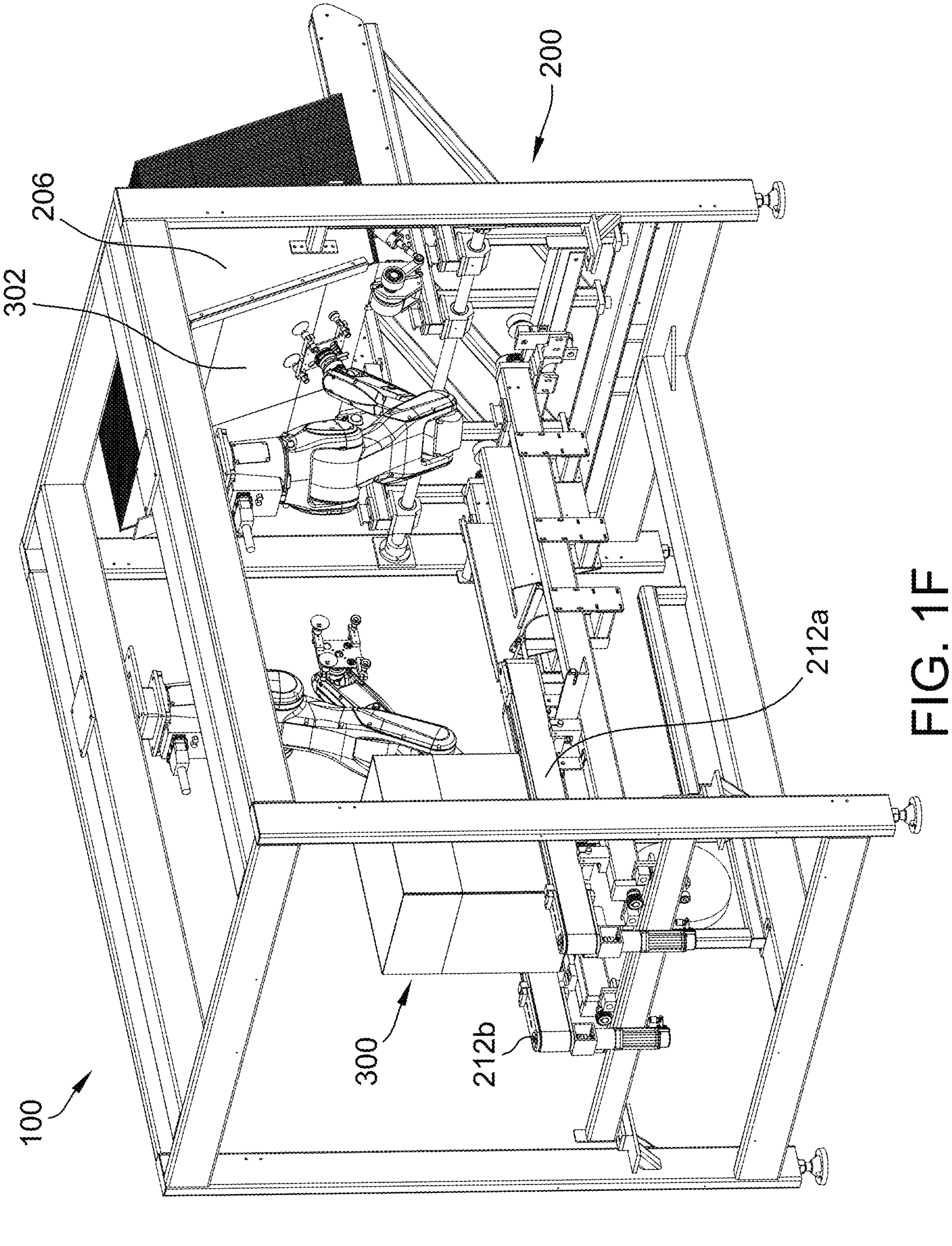

FIG. 1F shows the machine 200 operating to square the unfolded case blank 302 of the second erected carton 300 with the side belts 212*a*, 212*b* in a sixth stage of erecting the second carton 300 while the first robotic arm 202*a* and second robotic arm 202*b* return to their positions to restart the first stage of erecting another carton 300. In the sixth stage, sensors 208*a*, 208*b* (FIG. 13) are operable to detect whether the adjacent panels of the unfolded second case blank 302 are square or orthogonal to one another (i.e., perpendicular to one another). The speed of the side belts 212*a*, 212*b* are individually adjustable to make any corrections needed to square the panels in response to feedback from the sensors 208*a*, 208*b* as described below in relation to FIG. 5. Once the panels are squared, the bottom of the carton 300 may be sealed via the dispenser 218 (FIG. 13).

Once the sixth stage is completed, the erected carton 300 is shown to be ejected from the machine for further packaging operations, including but not necessarily limited to loading the article 118 in the interior volume 312 of the erected carton 300 and folding and sealing of the foldable flaps at the top end of the carton 300 to contain the article 118 therein for distribution, shipping and handling. Loading the article 118 may include installing case inserts to stably position the article 118 in the carton 300, as well as cushioning and support materials, and article wrapping materials as those in the packaging art would appreciate to ensure that the article 118 is in satisfactory condition when shipped to its final destination for unloading of the article 118 by the end purchaser or end user.

Figure 2A:
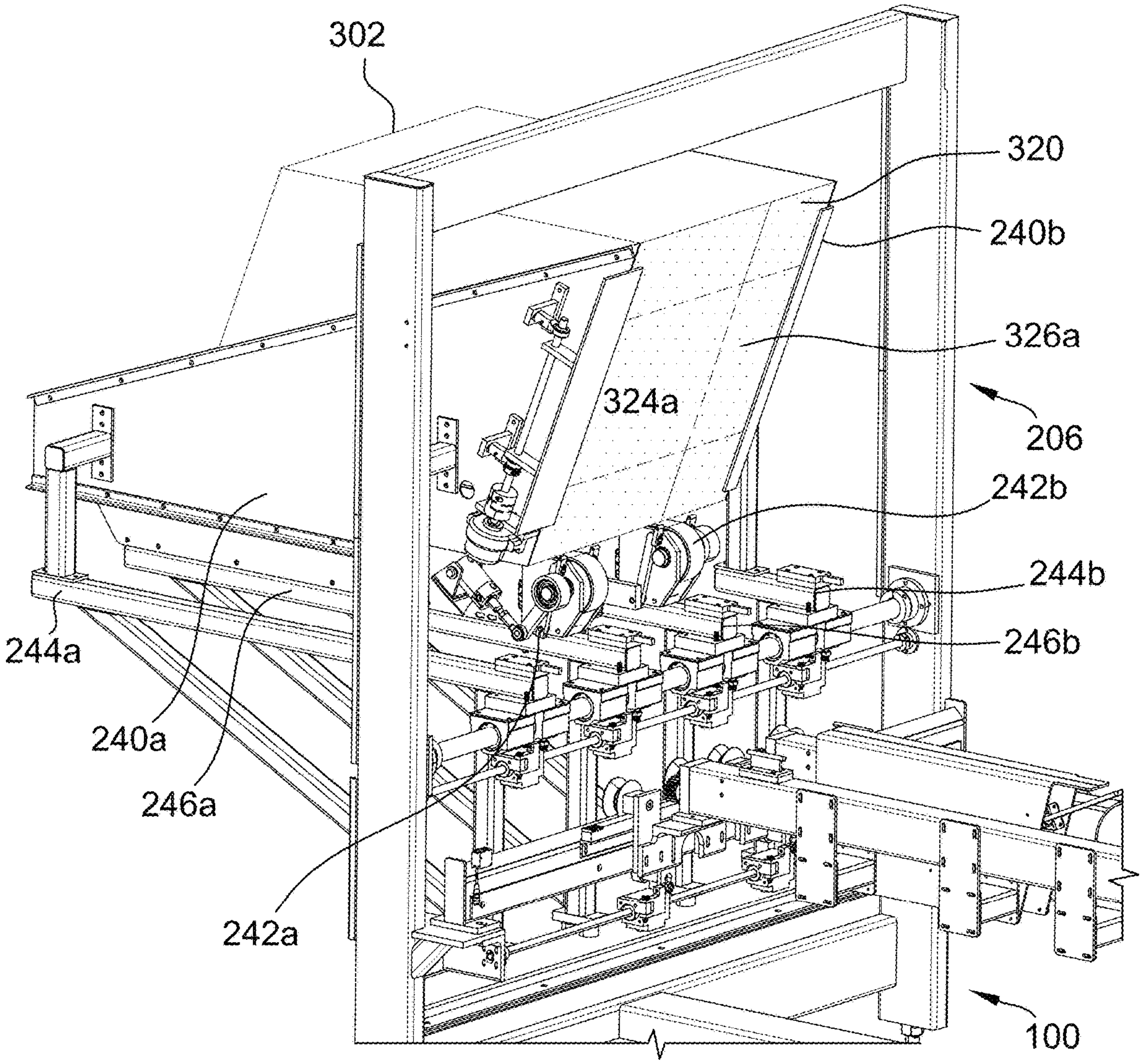
FIGS. 2A-2B show a schematic, perspective and front view, respectively of an example of a magazine and folded case blanks of a machine and system according to the present disclosure.
Figure 2B:
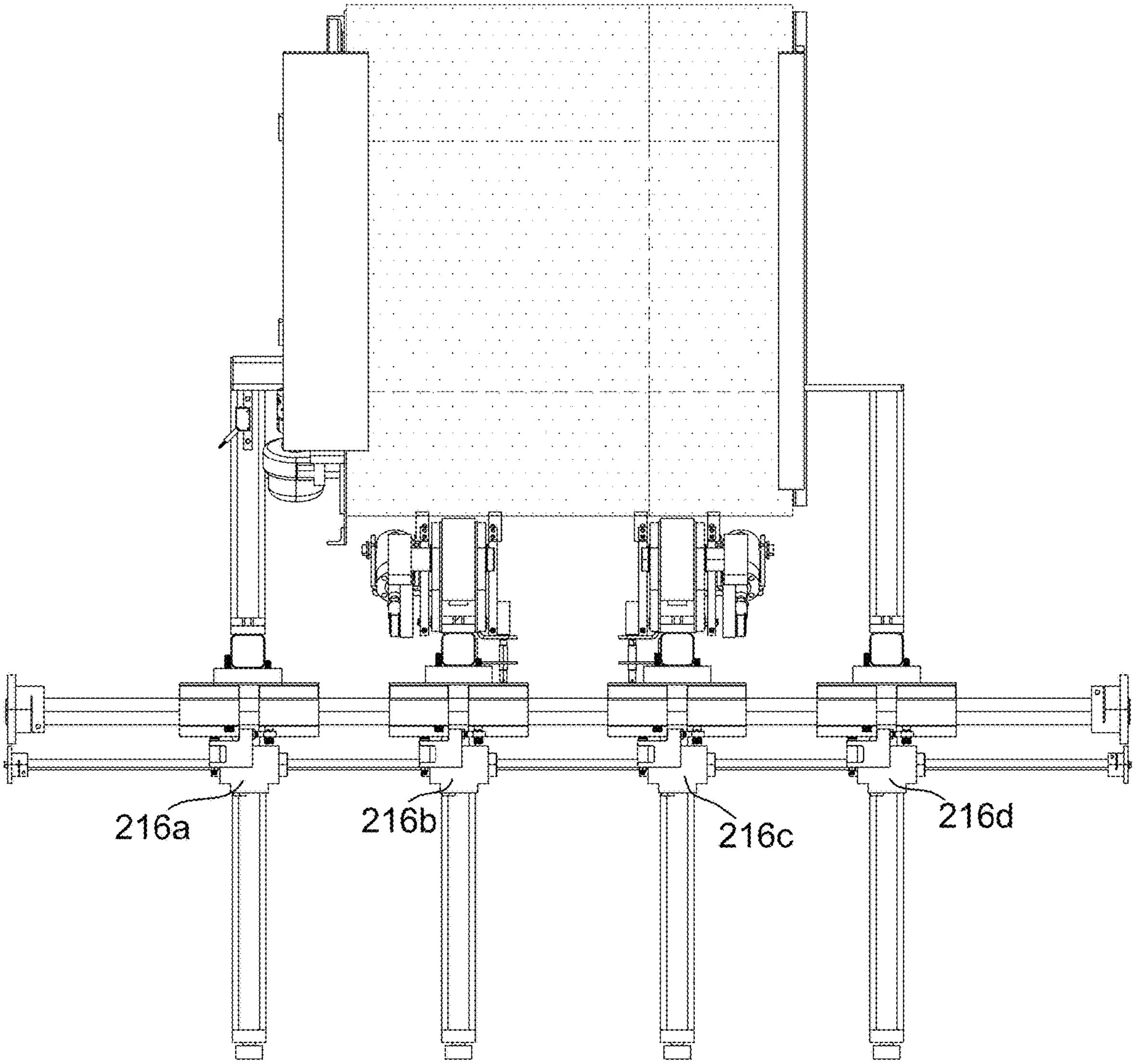
Figure 10:
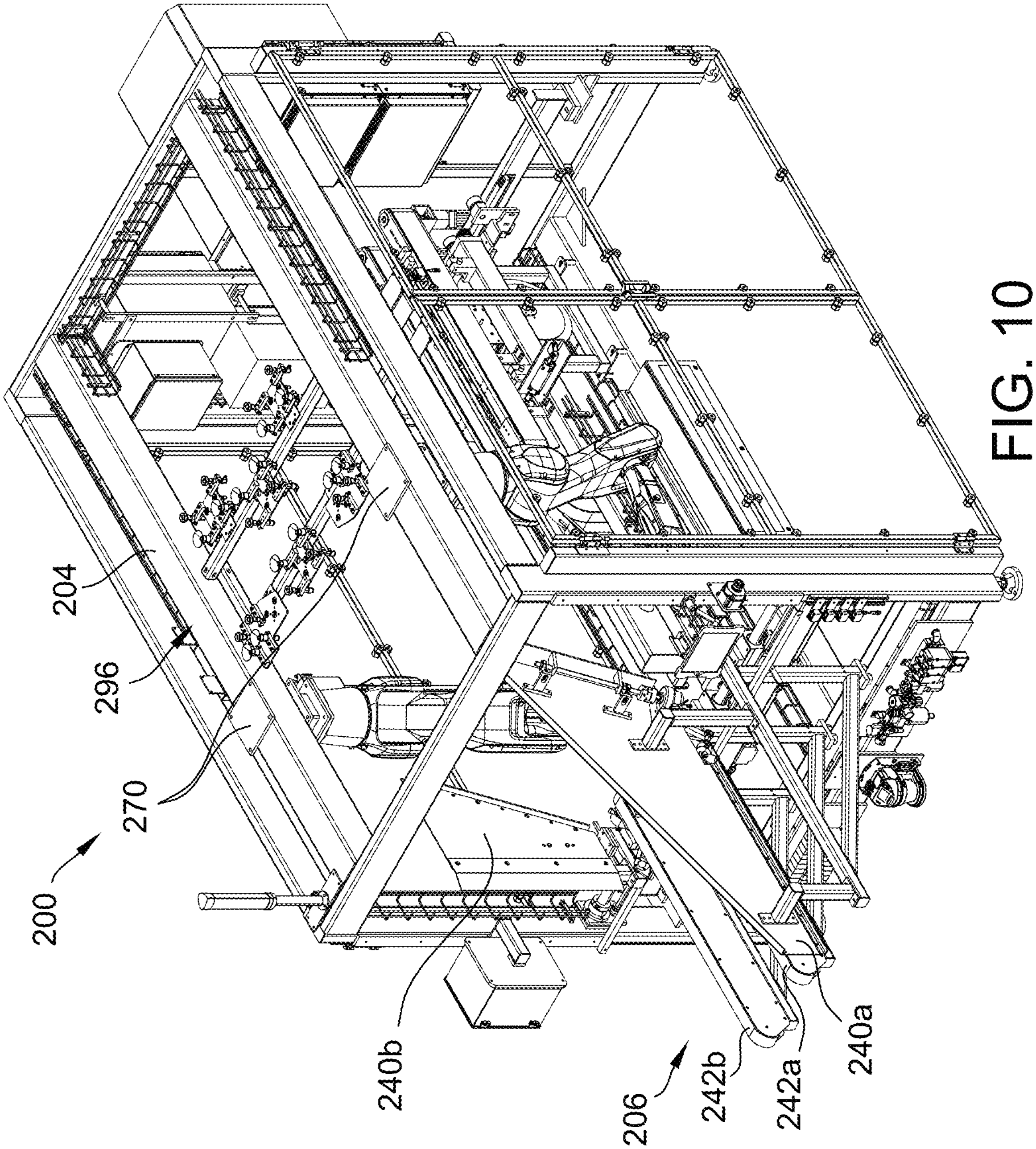
FIG. 10 is a perspective view of an example of a machine and system according to the present disclosure.
Figure 11:
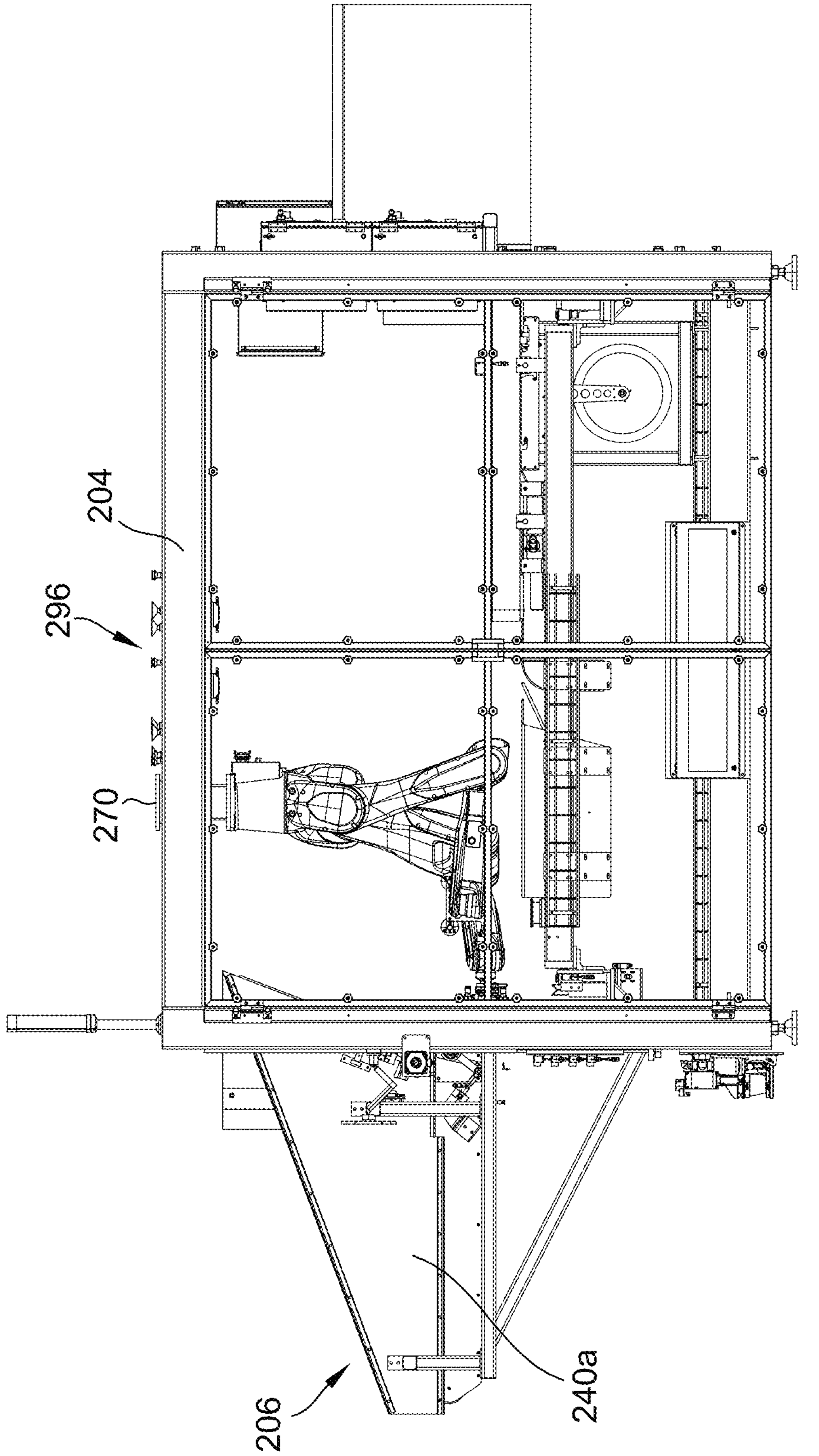
FIG. 11 is a side view of an example of a machine and system according to the present disclosure.
Figure 12:
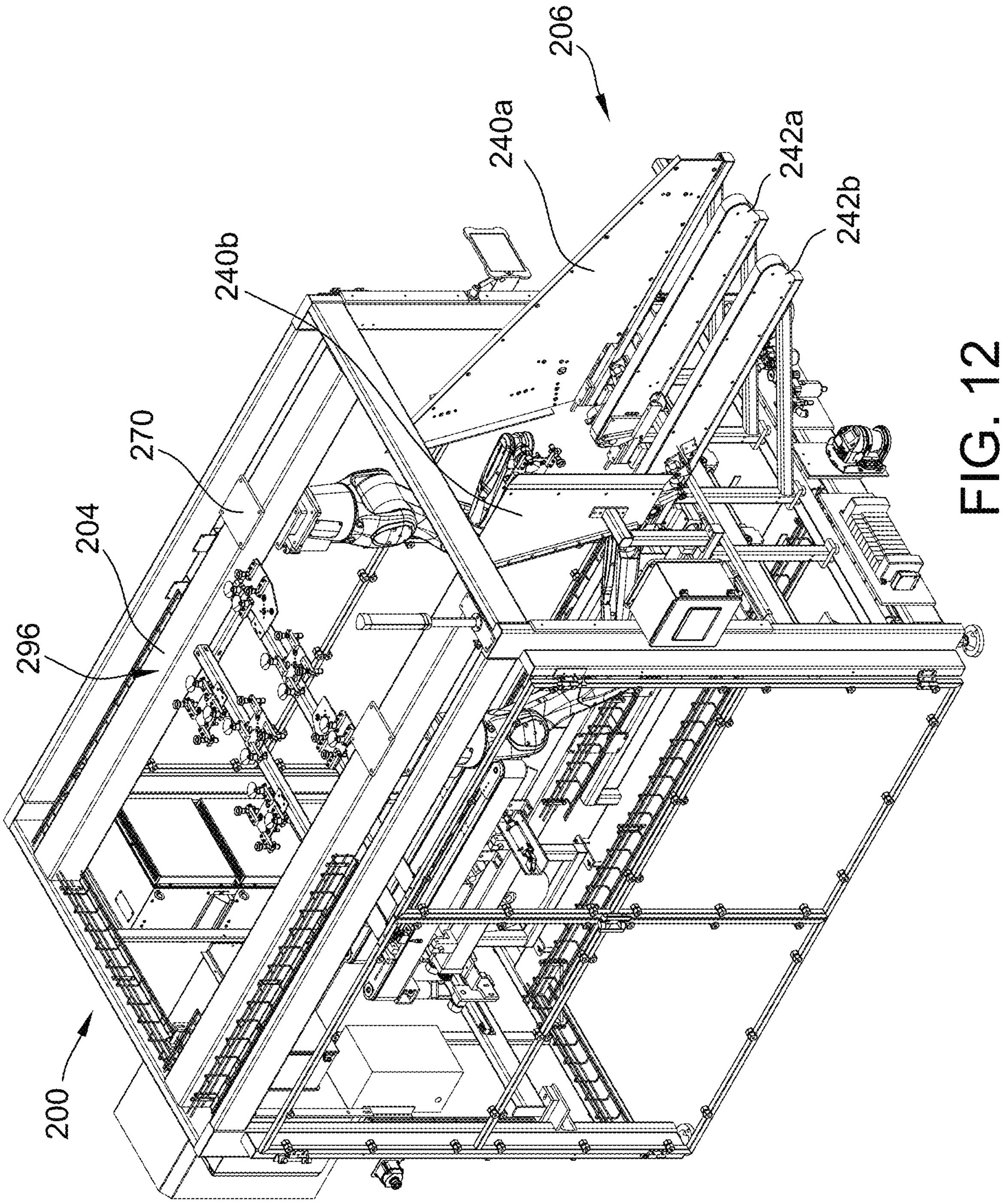
FIG. 12 is a perspective view of an example of a machine and system according to the present disclosure.

FIGS. 2A and 2B illustrate further features of the magazine 206 in perspective view and front view. The magazine 206 is also shown in rear perspective view in FIGS. 10 and 12. In the example shown, the magazine 206 includes a first side wall 240*a*, a second side wall 240*b*, a first conveyor assembly 242*a* and a second conveyor assembly 242*b*. The first side wall 240*a* is an elongated tapered wall as best seen in FIG. 10 which extends nearly the full length of the conveyor assembly 242*a* while the second side wall 240*b* is tapered but not elongated on the opposite side of the magazine 206 from the first wall 240*a*. The elongated wall 240*a* provides a guide surface for loading of the case blanks 302 while the non-elongated wall 240*b* ensures proper positioning of the blanks 302 only toward the forward end of the magazine 206 where the robotic arm 202*a* accesses the blanks 302. As shown the wall 240*b* extends alongside the conveyor assembly 242*b* for a relatively small portion of the length of the conveyor assembly 242*b*. The conveyor assemblies 242*a*, 242*b* are about the same length in the example shown and are located in between the side walls 240*a*, 240*b*. While a particular geometry and arrangement of magazine components are shown and described in this example, variations are of course possible.

As shown in FIGS. 2A and 2B, the first side wall 240*a* is attached to a first side rail 244*a* and the second side wall 240*b* is attached to a second side rail 244*b*. Likewise, the first conveyor assembly 242*a* is attached to a third side rail 246*a* and the second conveyor assembly 242*b* is attached to a fourth side rail 246*b*. The side rails 244*a*, 244*b* and 246*a* and 246*b* are slidably movable on a lateral rod 248 such that the spacing of the rails 244*a*, 244*b* and 246*a* and 246*b* is adjustable to change the position of the side walls 240*a* and 240*b* and the position of the conveyor assemblies 242*a* and 242*b* relative to one another. As such, a range of different sizes of case blanks 302 can be used in the magazine 206. The rails 244*a*, 244*b* and 246*a* and 246*b* can be selectively locked in place with brake element assemblies 216*a*, 216*b*, 216*c*, 216*d* or unlocked to reposition the rails 244*a*, 244*b* and 246*a* and 246*b* to accommodate the size of the case blanks 302 to be utilized. In the example of FIGS. 2A and 2B, the case blanks 302 are smaller than the blanks shown in FIG. 1 and will therefore form a smaller carton 300 when erected.

A stack of folded case blanks 302 is received in the magazine 206 between the side walls 240*a* and 240*b*. The conveyors assemblies 242*a*, 242*b* are separately controlled and operable to advance the stack of blanks 302 forward as the outermost one of the blanks 302 is individually picked by the robotic arm 202*a*. As such, each successive blank 302 may be picked by the robotic arm 202*a* in the desired orientation and at the proper position to begin the first stage of case erection. In the example shown in FIGS. 2A and 2B, the orientation of the case blanks 302 is reversed relative to the orientation shown in FIGS. 1A to 1F. The robotic arms 202*a*, 202*b* can assemble the carton 300 when the blanks 302 are loaded in the magazine 206 in either orientation, and the side walls 240*a*, 240*b* can be swapped or reversed relative of the illustrated example such that it can be used in left-hand or right-hand configurations, as desired. The magazine 206 can be loaded with case blanks 302 without interrupting the machine's operation. The magazine 206 having the illustrated features provides ease of customization for the intended user or operator of the machine 200.

Figure 3A:
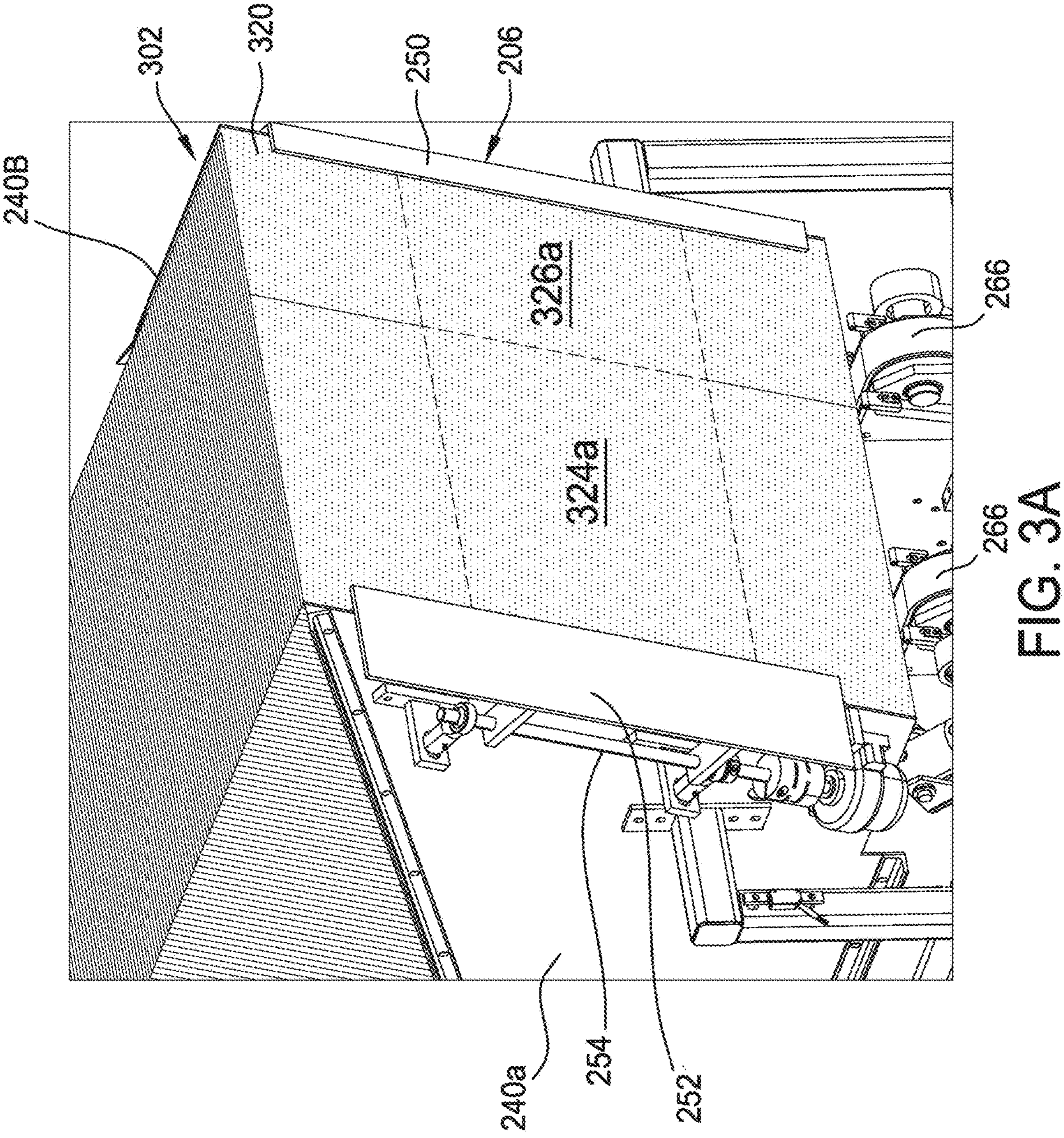
FIGS. 3A-3B show partial detailed views of an example of a magazine of a machine and system according to the present disclosure.
Figure 3B:
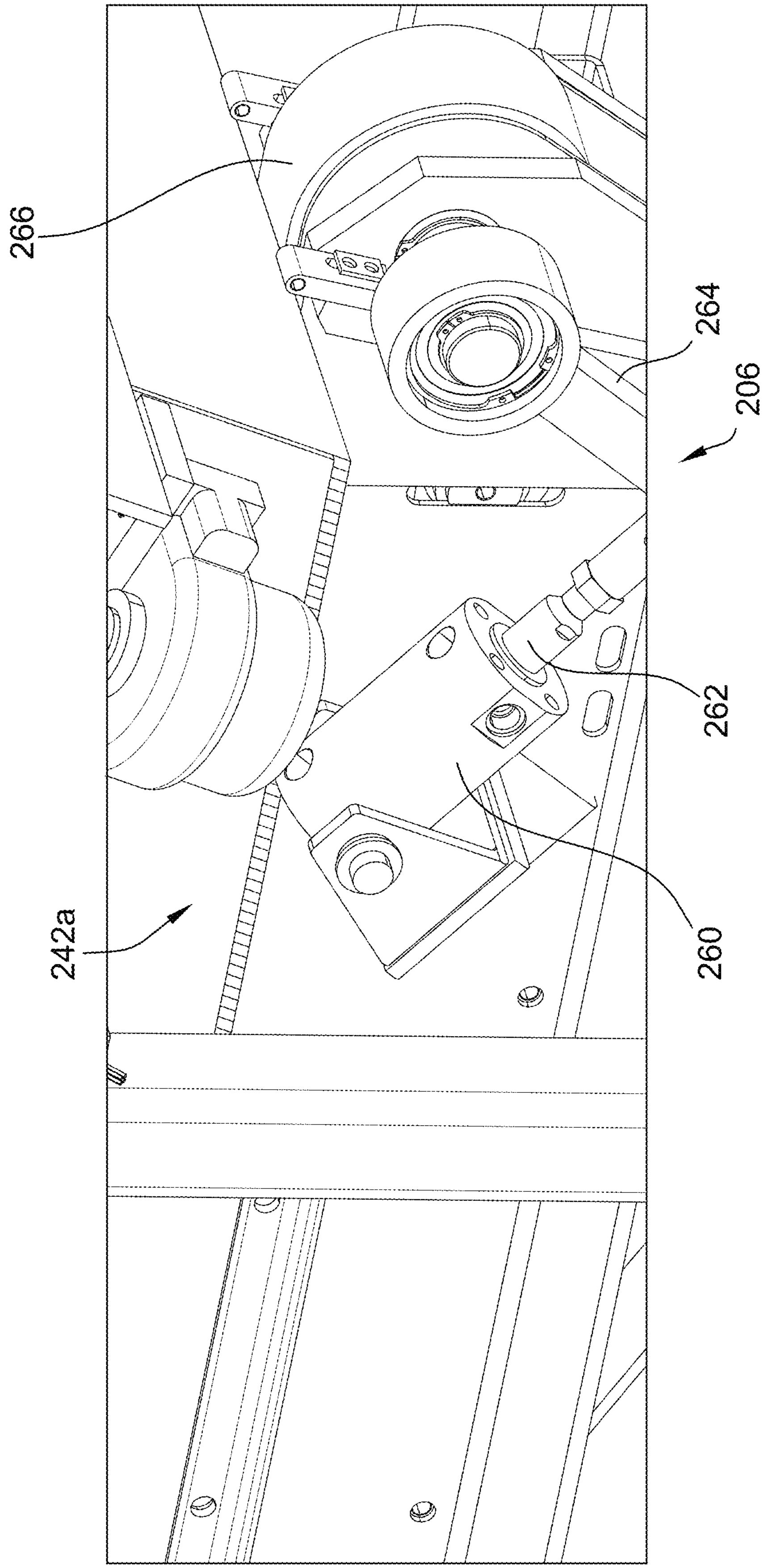

FIGS. 3A and 3B illustrate further features of the magazine 206 including stops 250 and 252 respectively holding the corresponding edges of the folded case blanks 302 in place so that they can be picked by the first robotic arm 202 and also to release the outermost one of the case blanks 202 from the magazine 206. The stops 250, 252 are shown as elongated rectangular elements on opposing leading side edges of the magazine side walls 240*a*, 240*b*. The stops 250, 252 are inclined and lean forward on the leading end of the magazine 206 as shown such that the case blanks 302 lean forward against the stops and are held in place under their own weight against the stops 250, 252.

In the example shown, the stop 250 is static or stationary in the operation of the magazine 206 and does not move while the stop 252 is driven by an actuator to move relative to the magazine 206. In the example shown, the stop 252 is displaced by the actuator such as an air cylinder so that the stop 252 pivots or rotates about a longitudinal axis of a shaft 254. The stop is pivoted outwardly and away from the outermost case blank 302 a few degrees away from the edge of the outermost case blank 302 where the stop 252 is located. The pivoting of the stop 252 beneficially establishes a small clearance for the corresponding side edge of the blank 302 to flex, move or unfold as the first robotic arm 202 engages one or more of the panels on the first side 320 of the case blank 302. The pivoting stop 252 facilitates picking of the case blank 202 and its removal from the magazine 206 with one robotic arm 202*a* applying a simple pulling force. One the outermost case blank 302 is removed, the stop 252 may pivot back to its original position that is substantially coplanar with the first stop 250 that opposes the stop 252 such that the next case blank 240 is held in a fully folded, planar position until the robot arm 202*a* returns again to the magazine for picking and removal of the next case blank 302.

In another example, the relative positions of the stops 250, 252 could be reversed on the front of the magazine such the pivoting of the stop 252 occurs on the opposing side edges of the case blanks 302 than in the illustrated examples. Various different examples are also contemplated wherein two driven stops may be provided or two static stops may be provided. As such, the driven stop 252 in some examples may be considered optional and need not be provided. Also, while one mechanical arrangement of a driven stop 252 is shown, other mechanical arrangements are possible to realize the benefits described.

FIG. 3B is a partial detail view of the magazine conveyor assembly 242 (also shown in FIG. 6) which includes a rotatably mounted cylinder 260. The cylinder 260 includes a reciprocating piston 262 and an actuator link 264. The link 264 is coupled to the piston 262 at one end, and displacement of the piston 262 causes the link 264 to rotate at its opposite end which in turn causes a belt 266 to advance in the assembly 242*a*. As such, intermittent or continuous operation of the cylinder 260 to extend and retract the piston 262 realizes a full 360° rotation of the link end 260 and an advancement of the belt 266 in the desired direction to urge the case blanks 302 against the stops 250, 252 for optimal positioning of the outermost blank 302 to be engaged by the first robotic arm 202*a* when the case blanks 302 are loaded on the belt 266.

The conveyor assembly 242*b* (FIGS. 2A and 7B) is constructed similarly to the conveyor assembly 242*a* in the example shown and also includes a cylinder driven belt 266 (FIG. 3A). The belts 266 are separately controlled in a contemplated example to move the case blanks 302 forward toward the stops. Variations of conveyor belts and variations of controls therefore are of course possible in further or alternative examples of magazines. In some examples, the conveyor assemblies 242*a*, 242*b* could likewise be different rather than the same in their construction and operation.

Figure 4:
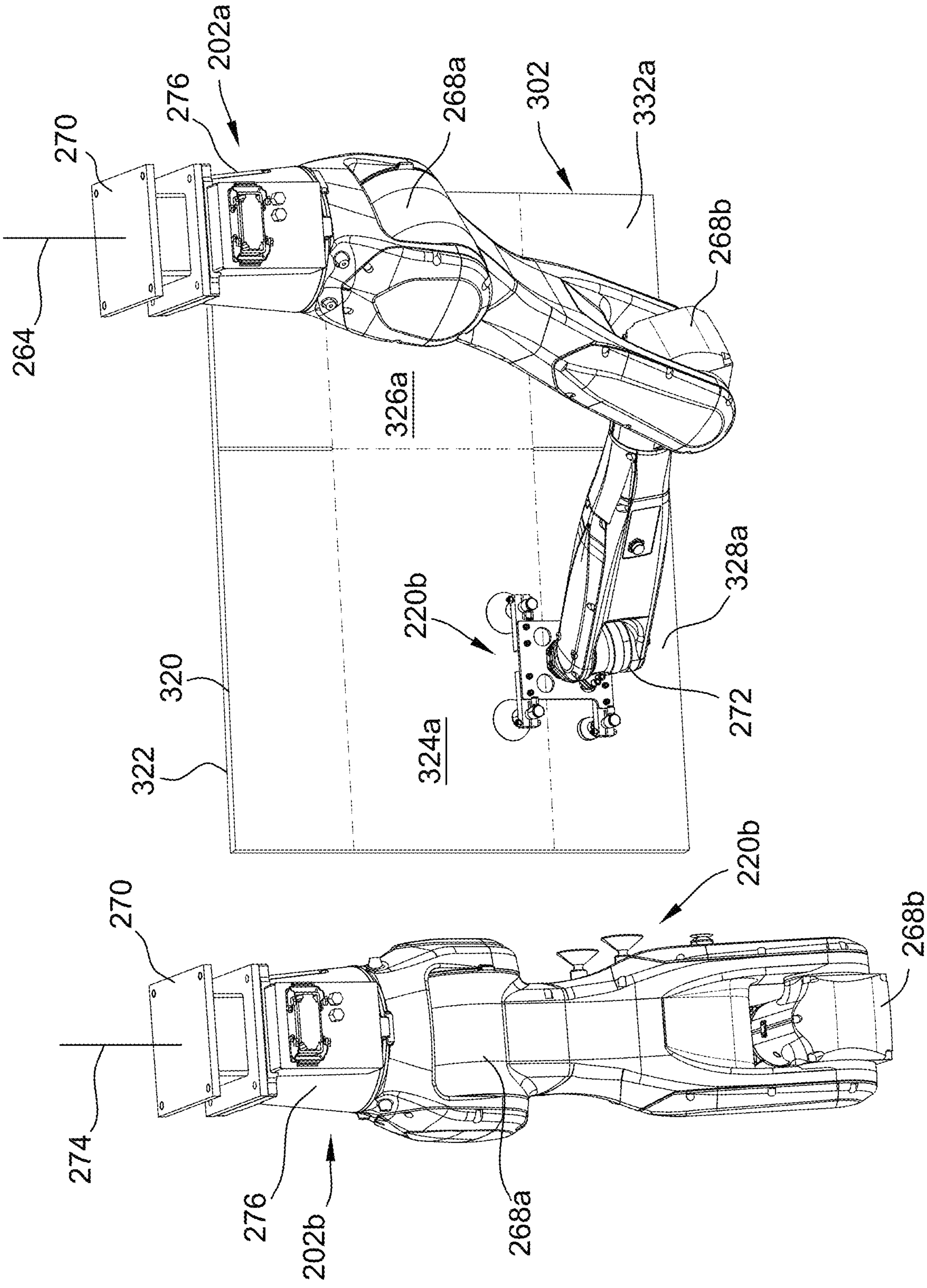
FIG. 4 is a schematic, partial view of an example of robotic arms with erecting tool of a machine and system according to the present disclosure.

As best shown in FIG. 4, the robotic arms 202*a*, 202*b* are independently controllable, multi-axis arms including a horizontal mounting plate 260 at an upper extremity for mounting to the frame 204 of the machine 200 in a spaced apart relation to one another (also shown in FIGS. 10, 11, 12) and a lower extremity 272 including an erector tool 220*b* that may engaged to the case blank 302 as it is being erected. In between the upper and lower extremity each robotic arm 202*a*, 202*b* may rotate about a vertical axis 274 via an upper section 276, and may also pivot at two locations 268*a*, 268*b* to orient the lower extremity 272 of the arm and the erector tool 220*b* in three-dimensional space. In the example illustrated, the robotic arms 202*a*, 202*b* are identically constructed to one another, although in other examples the arms 202*a*, 202*b* may be differently constructed from one another as desired.

The construction and operation of such robotic arms 202*a*, 202*b* is generally well-known and understood by those in the art, and accordingly further description thereof is not believed to be necessary. The robotic arms 202*a*, 202*b* are generally programmable to perform desired tasks at desired locations in three dimensional space within the frame 204 of the machine 200 in contemplated examples, although the particular motion profiles for the robotic arms described herein to realize the beneficial case erection are believed to be unique in the packaging field. The dual robotic arms 202*a*, 202*b* beneficially provide higher speed case erection and throughput than an otherwise similar machine including a single robotic arm would be capable of providing. For example, and by virtue of the two robotic arms 202*a*, 202*b* working in combination, about 30 cases per minute can be erected in the machine 200, which is believed to be about twice the rate of prior machines for erecting similar cartons with a single arm robot that is configured to engage more than one side panel in the unfolding of a similar case blank.

As shown in FIG. 4, the first robotic arm 202*a* is progressing toward the case blank 302 with an erector tool 220*b* including a base plate and four vacuum cups extending from the corners of the base plate which, in turn, is attached to a distal end extremity 272 of the first robotic arm 202*a*. In contemplated examples, the first robotic arm 202*a* is programmed to engage two of the vacuum cups to a first panel of the blank 302 (e.g., the panel 324*a*) and to engage two of the vacuum cups to a second panel of the blank 302 (e.g., the major flap 328*a*). It is understood, however, that in another example the first robotic arm 202*a* may engage the panels 326*a* and the flaps 332*a* in another manner while still erecting cartons in a similar manner to that shown and described in relation to FIGS. 1A to 1F. Further, in some examples, all of the vacuum cups provided in the tool 220*b* may engage the same panel of the case blank 302 (e.g., the panel 324) while otherwise successfully erecting cartons by completing folding operation of the flaps.

While four vacuum cups and a generally square base plate having sides of equal length are shown in the tool 220*b* illustrated in FIG. 4, the shape and geometry of the base plate may vary considerably from that shown. The tool 220*a* shown in FIGS. 1A to 1F has an elongated base plate that is optimally configured to place the vacuum cups farther apart for assembly of a larger case blank 302. Additionally, and in other examples, a greater number of vacuum cups (e.g., six vacuum cups) may be provided as well as a lesser number of vacuum cups (e.g., three vacuum cups) may also be provided.

As previously mentioned, a set of n tools 220 *a*, 220 *b*, 220 *c*, 220 (FIGS. 9-13) may be provided having different spacing between vacuum cups or different numbers of vacuum cups to engage panels of different sizes, and the robotic arms 202*a*, 202*b* may automatically select the applicable tool from the set of tools when differently sized folded case blanks are introduced to the machine. Such a set of tools may be stored, for example at an overhead location 296 (FIGS. 9-12) of the machine frame 204 that is accessible to the robotic arms 202*a*, 202*b*, with the robotic arms automatically moving to the overhead location 296 and automatically switching between the available tools in the set as needed for different sizes of case blanks 302. The example tool set in FIGS. 9-13 includes six different tools stored at the overhead location 296 for use by the dual robotic arms 202*a*, 202*b* to erect cartons of different sizes. Greater or fewer numbers of tools may be provided in further and/or alternative examples. Additionally, the set of tools could be stored at an alternative location on the machine 200 or otherwise supplied to the robotic arms 202*a*, 202*b* when erecting cartons of different sizes. Each tool is relatively small and simplified relative to known tools for erecting similar cartons, beneficially reducing tooling cost while increasing the flexibility of the machine to erect different types of cartons.

Figure 5:
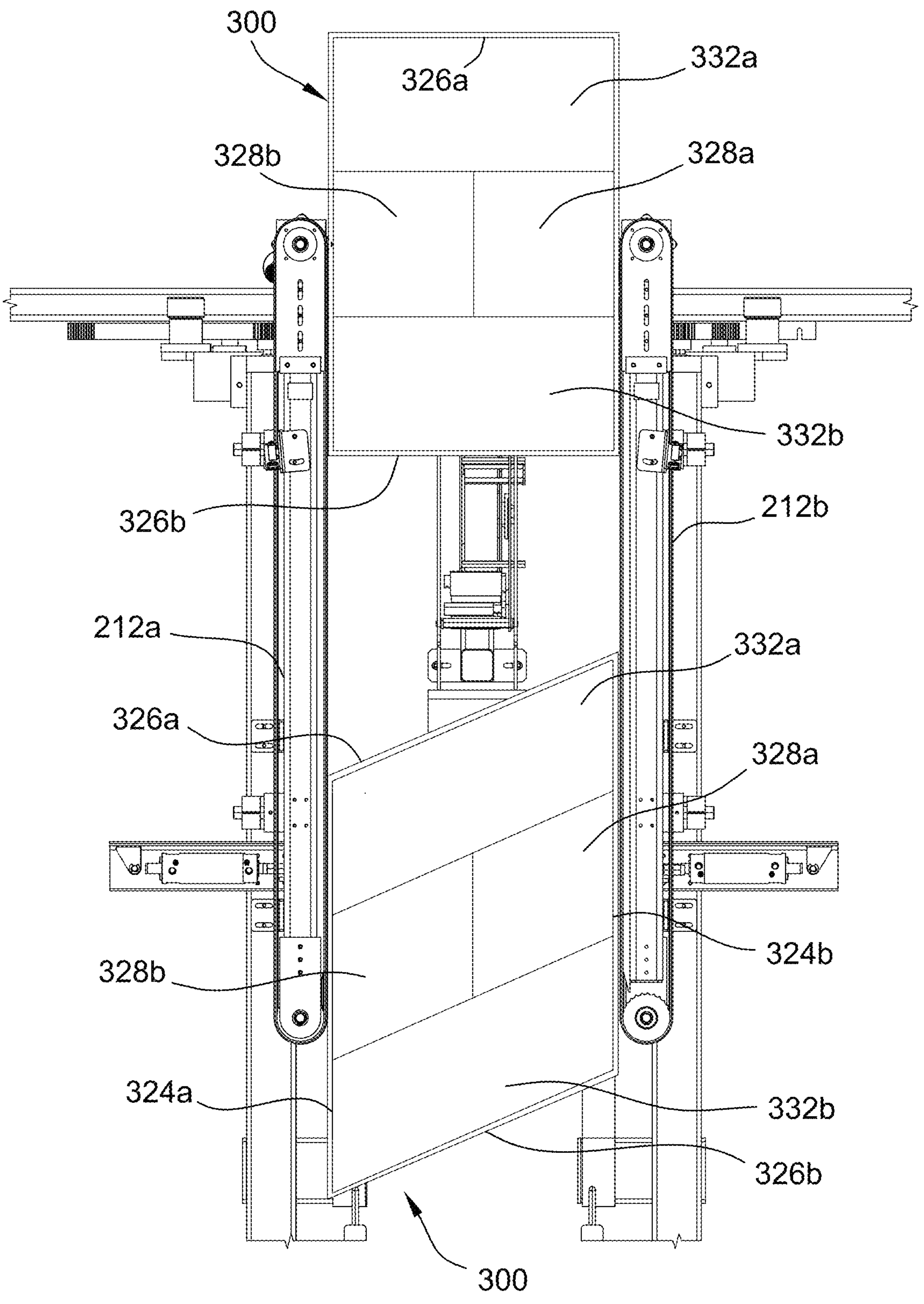
FIG. 5 is a schematic, top view of an example of side belts of a machine and system operative to square an unfolded case blank according to the present disclosure.

FIG. 5 illustrates an operation of the machine 200 in top view to square the panels of the carton 300, and particularly to square the end panels 326*a*, 326*b* so that they extend perpendicularly to the side panels 324*a*, 324*b* in the sixth stage of case erection discussed above. In the lower portion of FIG. 5 a carton 300 is shown with side panels 324*a*, 324*b* extending parallel to the side belts 212*a*, 212*b*, while the leading and trailing end panels 326*a*, 326*b* extend obliquely to the side panels and to the side belts 212*a*, 212*b*. In this scenario, sensors 208*a*, 208*b* (FIG. 13) placed at fixed locations with respect to the machine 200 will detect the angular position of the leading end wall 326*a*, and in response the speed of one or both of the side belts 212*a*, 212*b* can then be automatically adjusted to eliminate the oblique angle and bring the facing end panel 326*a* and the trailing end panel 326*b* into the desired perpendicular orientation as shown at the upper portion of FIG. 5. The carton 300 may therefore be automatically repositioned from the configuration shown at the lower portion to the squared configuration shown at upper portion of FIG. 5.

In a contemplated example, a pair of laser sensors (FIG. 13, sensors 208) are mounted at a fixed location on the machine 200 or relative to the machine 200. The laser sensors are operative to determine a distance from each laser sensor to respective edge portions of the leading end panel of the case blank 302 which faces the pair of laser sensors as the carton advances toward the sensors. If the determined distances from each sensor are equal, the panels are square and no correction is needed. If the determined distances are unequal, one or more of the side belt speeds is controlled to make the sensed distances equal and therefore square the panels of the carton 300. Known servo controls are utilized to adjust the belt speed to obtain the equal distance from the sensors. Similar functionality could be realized by sensing the orientation of the trailing end panel instead of the leading end pane in the carton, and in some examples both the orientation of the leading and trailing end panels could be sensed in order to ensure that the panels are squared.

Once the panels are squared, the bottom of the carton 300 may be easily sealed before the carton is ejected from the machine 200. In one example, a tape dispenser (FIG. 13, dispenser 218) is applied to tape the adjacent edges of the major flaps 328*a*, 328*b* and seal the bottom end of the carton from a location beneath the carton on the machine 200. In other embodiments, adhesives other than tape may be dispensed in combination with folding processes with similar effect to seal the bottom of the carton 300. By ensuring that the panels are square prior to sealing, highly reliable sealing can be realized with reduced amounts of wastage in the erection of cases. Throughput may also be increased by avoiding instances of machine shut-down to correct sealing issues, including but not limited to leakage of liquid adhesives or improperly taped cartons because the panels are misaligned (i.e., not square). In these aspects, the automatic squaring of the panels in the machine renders it possible to erect cases with a single robot arm while still ensuring efficient and effective case sealing. As such, in some examples the second robotic arm 202*b* may not strictly be needed and may be omitted. More precise placement of the case on the rail assemblies is ensured, however, by the second robotic arm 202*b* assisting the first robotic arm 202*a* and higher speed and throughput is accordingly realized by the operation of two robotic arms instead of one.

Figure 6A:
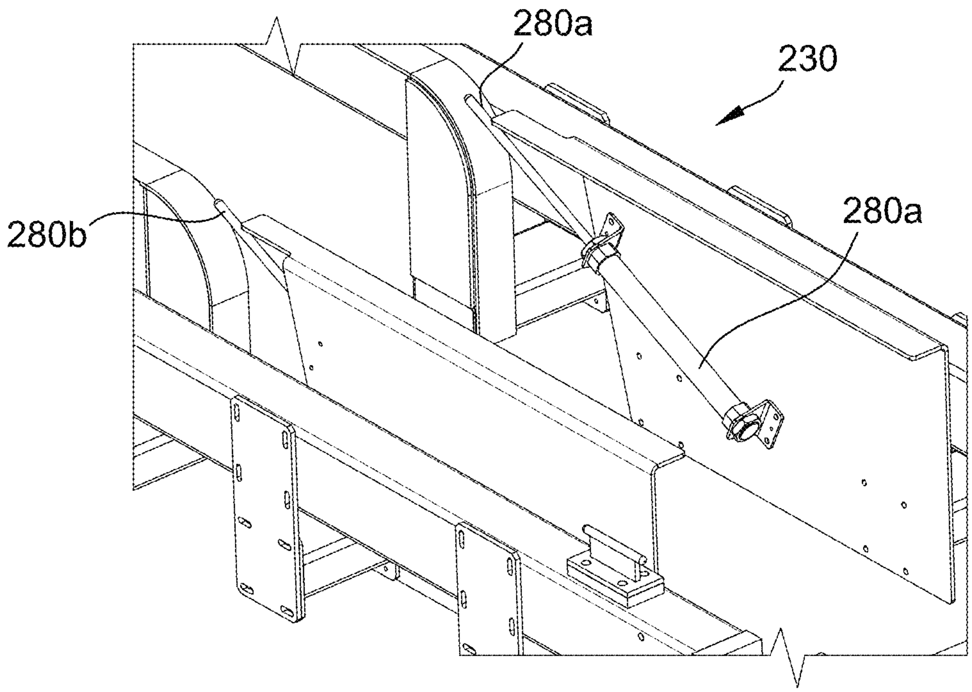
FIGS. 6A-6B show a schematic, partial perspective view of an example of features for folding panel flaps while erecting a case in a machine and system according to the present disclosure.
Figure 6B:
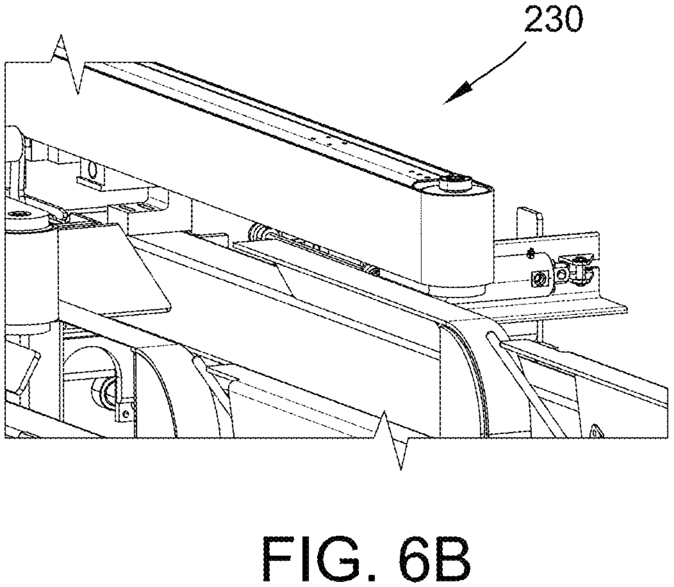

FIGS. 6A and 6B illustrate portions of the rail assembly upon which the robotic arms place the case blanks 302 to erect cartons 300. In FIG. 6A, a first portion of the rail assembly 230 includes a pair of opposed static cylinders 280*a*, 280*b* having distal ends 282*a*, 282*b* extending toward and to a gap between first and second pairs of horizontally extending and co-planar rail surfaces on differently shaped rail supports. As such, and by virtue of the cylinders 280*a*, 280*b*, a partly completed carton having folded minor flaps can pass over and between the rail surfaces without the trailing minor flap being able to unfold in the gap.

FIG. 6B shows another portion of the rail assembly including a displaceable actuator element that causes one of the major flaps of the carton to be folded on the bottom of the carton. A second actuator is positioned opposite the first actuator to cause the second major flap to be folded. The first and second minor flaps are folded over the previously folded minor flaps, and the carton is then delivered to the side belts for the squaring operation shown in FIG. 5 and sealing of the carton.

Figure 7A:
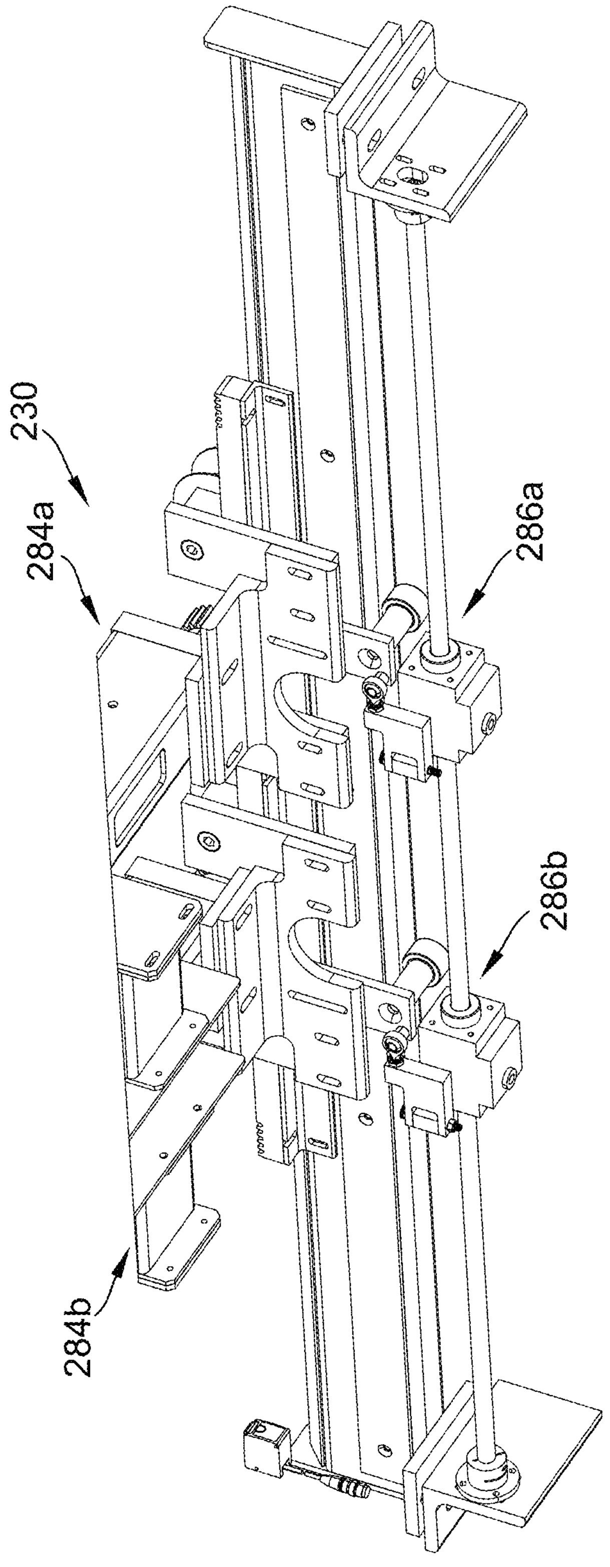
FIGS. 7A-7B show a schematic, partial perspective view of an example of a brake assembly associated with side belts and the magazine of a machine and system according to the present disclosure.

FIG. 7A is a partial end view of the rail assembly 230 including adjustably positionable rail members 284*a*, 284*b* that are slidably positionable relative to one another to move them closer together or farther apart from one another. Brake element assemblies 286*a*, 286*b* are provided to secure the rail members 284*a* and 284*b* in a desired position to erect cartons 300 of different sizes with different case blanks 302.

Each rail member 284*a*, 284*b* supports one half of the rail assembly for supporting and processing each opposing side of the carton 300. As such each rail portions includes the folding rail assemblies shown in FIGS. 6A and 6B and the conveyor assemblies for performing the squaring operation described above. By unlocking the brake element assemblies 286*a*, 286*b*, the rail members 284 may be slidable back and forth to adjust the relative positions of the rail assemblies to erect larger or smaller cartons 300, and by locking the brake assemblies the cartons of selected size may be reliably erected as described above.

The brake assemblies 386*a*, 386*b* may include spring loaded air cylinders to lock and unlock the positions of the rail assemblies and the conveyor assemblies. Laser sensors may be provided to monitor the rail positions and the conveyor assembly positions as further assurance of their proper positioning. If for some reason any of them become mis-aligned with their proper position in the operation of the machine the sensors can detect this and allow them to be moved back to the proper position for further use of the machine.

FIG. 7A is a perspective view showing the brake assemblies 216*a*, 216*b*, 216*c*, 216*d* shown in FIG. 2A which may be similarly operated to the brake assemblies 286*a*, 286*b* to adjust the magazine configuration for cartons of different sizes using different case blanks. Laser sensors may be employed to monitor the positions of the adjustable magazine components to detect any mis-alignment so that it may be corrected in the further use of the machine. While exemplary brake element assemblies are illustrated, variations are of course possible in other embodiments.

Figure 8A:
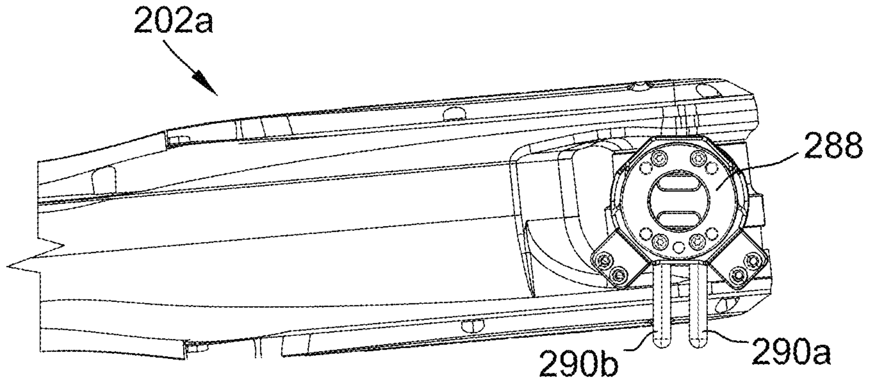
FIGS. 8A-8C show a schematic, partial perspective view of an example of automated change-over features associated with the robotic arms, side belts and the magazine for an automatic erecting of different sizes of case blanks and erected cases in a machine and system according to the present disclosure.

FIG. 8A shows the lower extremity of the robotic arm 202 *a* with an erector tool 220 removed. The connector structure for the attachment of the erector tool is shown, which may be universally connected to another erector tool 220 in the set of tools provided in an automatic operation of the robotic arm 220*a*. Also shown are opposed posts 290*a*, 290*b* that are slightly spaced apart from one another on the end extremity of the robotic arm 220*a*. Similar connector structure and posts 290*a*, 290*b* are provided on the lower extremity of the second robotic arm 202*b*. The posts 290*a*, 290*b* may engage complementary posts in the rail members and in the magazine to perform automated change-over operations by the robotic arms 202*a*, 202*b*.

Figure 7B:
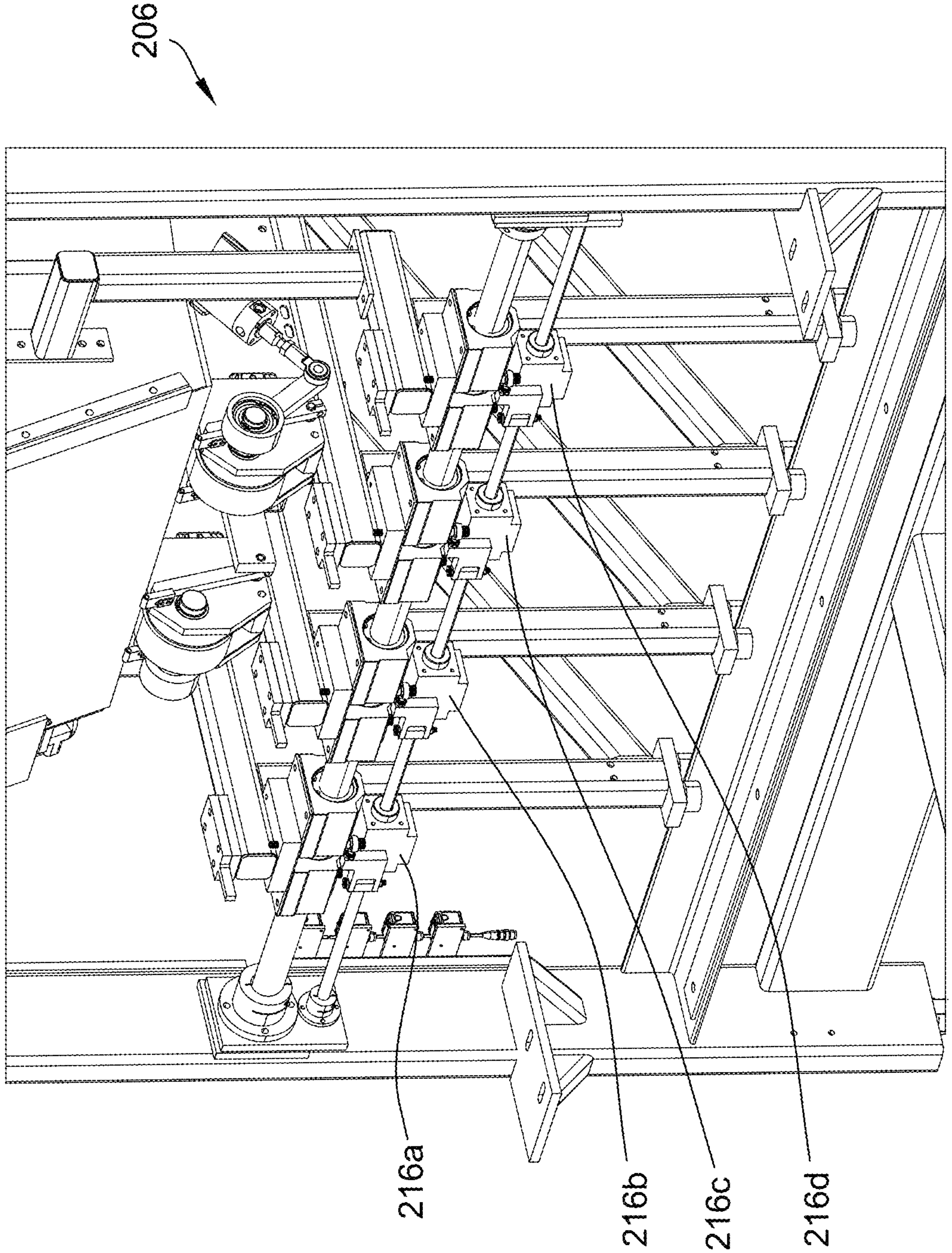
Figure 8B:
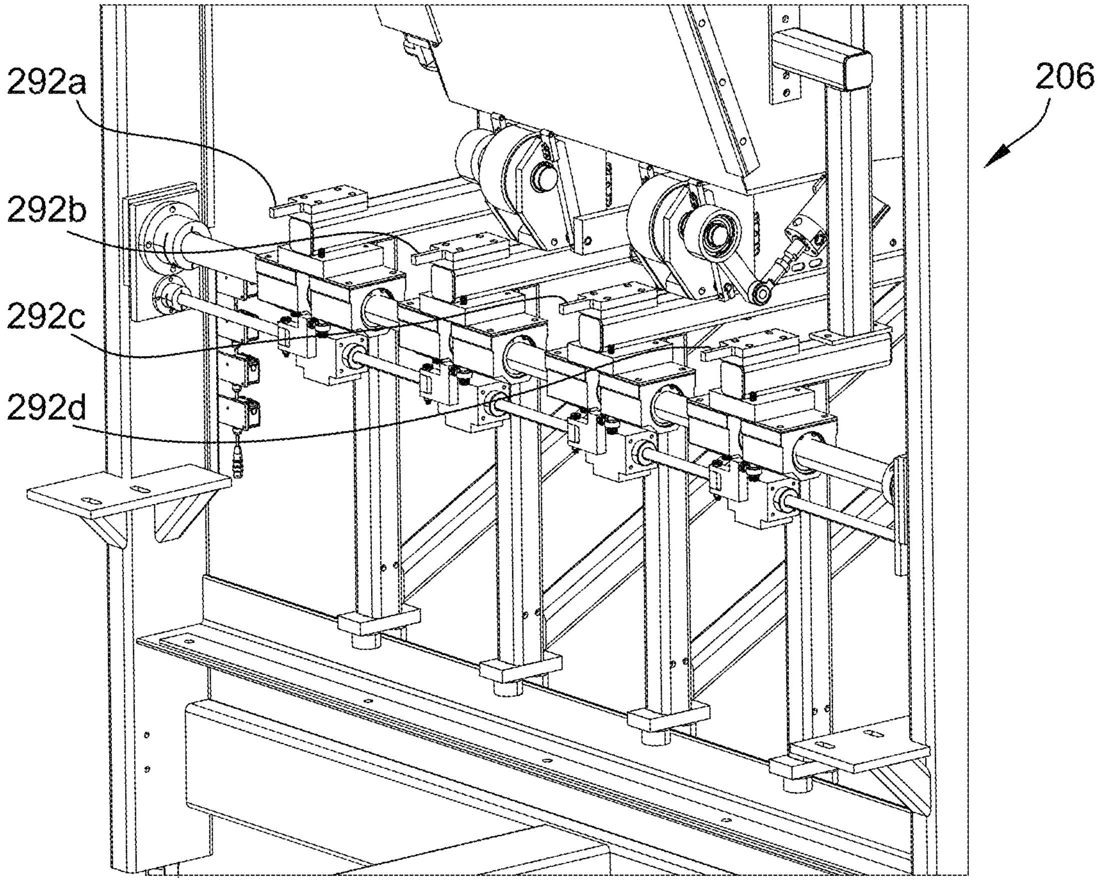

FIG. 8B is a view similar to FIG. 7B where change-over posts 292*a*, 292*b*, 292*c*, 292*d* are mounted to the pertinent rails of the magazine 206 to reconfigured the magazine 206 for case blanks of another size. When the brake assemblies are unlocked, the respective posts 292*a*, 292*b*, 292*c*, 292*d* may be received between the posts 290*a*, 290*b* of one of the robotic arms, such that lateral movement of the robotics arms 202*a*, 202*b* causes lateral movement of the associated rails of the magazine 206. The robot arms 202*a*, 202*b* can move the rails to the positions needed for the size of the case blanks to be utilized next by the machine 200. Once the rails are locked in place by the braking assemblies in the correct positions, the magazine 206 may operate to accommodate the new size of case blanks.

Figure 8C:
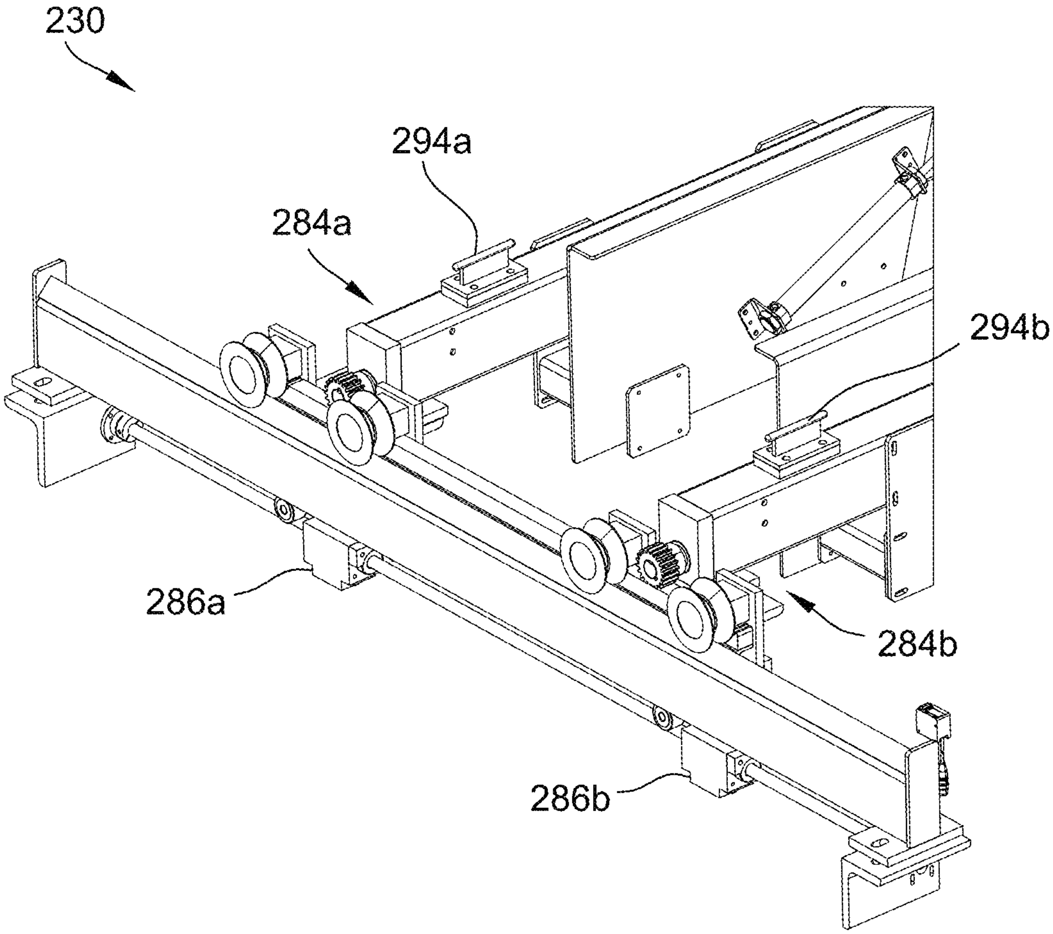
Figure 9:
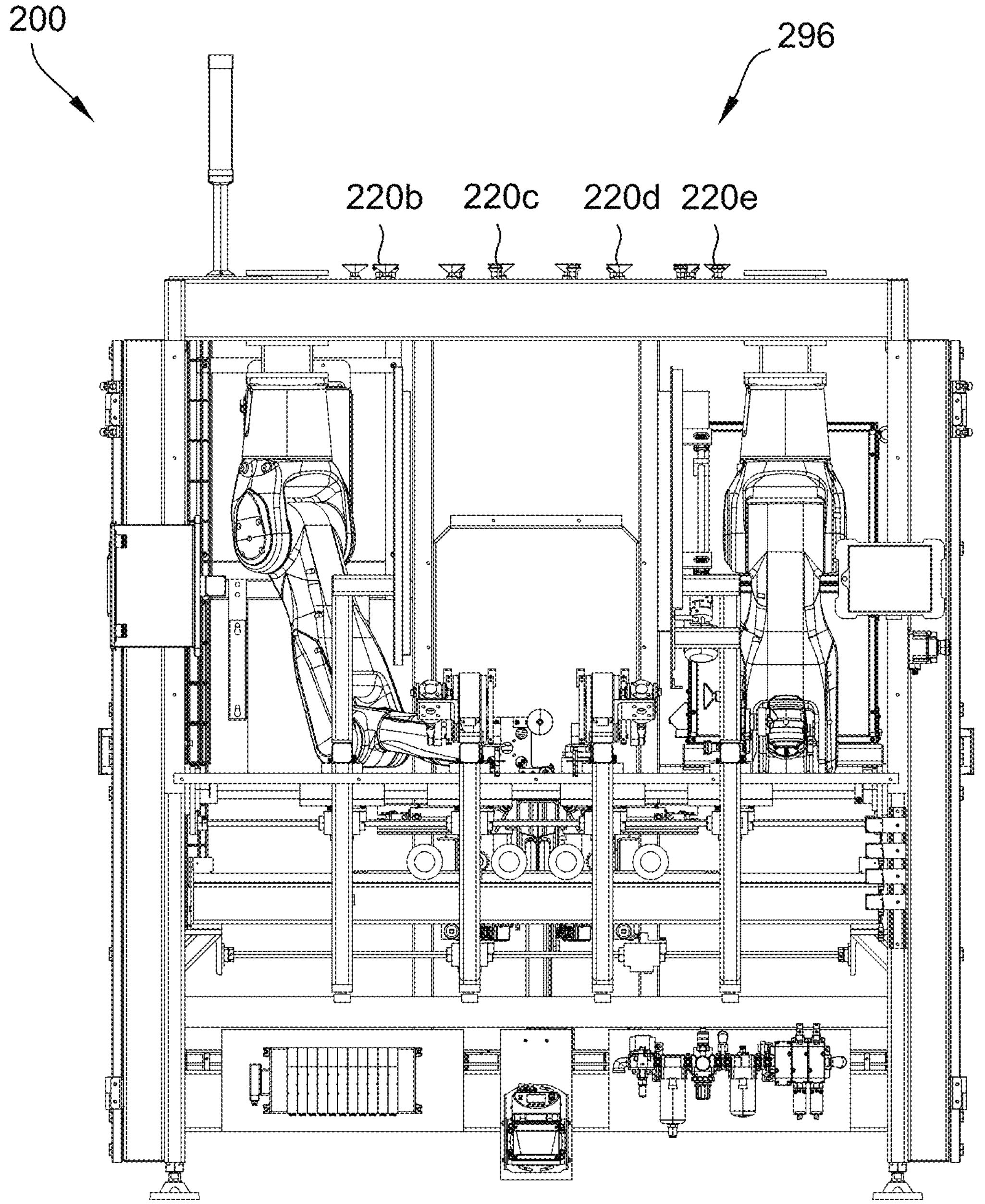
FIG. 9 is a schematic, rear view of an example of a machine and system according to the present disclosure.

FIG. 8C is a partial end view of the rail assembly 230 further showing slidable features of each rail member 284*a*, 284*b* through which their position may be adjusted to accommodate different case blanks to erect cartons of different sizes. Each rail member 284*a*, 284*b* is shown to include a change-over tab 294*a* or 294*b*. When brake assemblies 286*a*, 286*b* are unlocked, the respective change-over tab 294*a* or 294 may be received between the posts 290*a*, 290*b* of one of the robotic arms, such that lateral movement of the robotics arms 202*a*, 202*b* causes lateral movement of the associated rails members 284, 284*b* The robot arms 202*a*, 202*b* can move the rails to the positions needed for the size of the case blanks to be utilized next by the machine 200, which may be confirmed by sensors provided on the machine. Once the rail members 284*a*, 284*b* are locked in place by the braking assemblies in the correct positions, the rail assembly may accommodate the folding operations for the new size of case blanks.

In contemplated examples, the change-over operation begins by accepting an instruction for a new case blank size. Such instruction may entail receipt of length, width and depth information for the erected carton and the left hand or right hand configuration of the blanks upon which the machine 200 is to operate next. Data and information for the instruction may be manually entered by a machine operator or end user in some examples and automatically generated or received in other examples in different adaptations of the machine and system described herein. For example, machine readable elements such as bar codes could be read by the machine to identify the case blank size which may be accepted as an instruction for a new case blank size that requires an automatic change-over of the machine. As another example, the pertinent size and configuration of a case blank could be automatically sensed in a manner that would detect a change in case blank size or configuration in the operation of the machine and that would be accepted as an instruction for a new case blank size that requires a change-over operation.

In response to the instruction for a new case blank size, each robotic arm 202*a*, 202 *b* automatically moves to the overhead location 296 (FIGS. 9-12) where it can safely disconnect the erector tool 220 being used for case blanks prior to the instruction, as well as safely store the erector tool for further use. Also in response to the instruction, the brake assemblies may be unlocked so that the machine can be reconfigured for the new size of carton/case blank.

After the erector tools 220 are automatically removed by each robotic arm 202*a*, 202 *b*, the robotic arm 202 *a* moves the rail member 284 *a* (FIG. 8C) by engaging the tab 294 *a* and the posts 292*a*, 292*b* (FIG. 8B). When so engaged, lateral movement of the robotic arm 202*a* will move the lateral position of the rail 284*a* of the rail assembly 230 to accommodate the new size of carton/case blank and therefore adjust a first half of the rail assembly 230. The first robotic arm 202*a* also automatically engages and laterally repositions one half of the magazine 206 via the posts 292*c*, 292*d* (FIG. 8B) of the rail assembly and the conveyor of the magazine 206.

At the same time as the robotic arm 202*a* is working to adjust its half of the machine 200, the robotic arm 202*b* engages and moves the rail member 284*b* by engaging the tab 294*b* (FIG. 8C) and the posts 292 *c*, 292 *d* (FIG. 8B) to laterally position the rail member 248 *b* of the rail assembly 230 to accommodate the new size of carton/case blank and therefore adjust a second half of the rail assembly 230. The second robotic arm 202*b* also automatically engages and laterally repositions one half of the magazine 206 via the posts 292*a*, 292*b* (FIG. 8B) of the rail assembly and the conveyor of the magazine 206.

When the features in each half of the machine are laterally positioned, the applicable brake assemblies are then again engaged to lock the adjusted first half and second half of the magazine in the new positions for the new size of carton/case blank. The robotic arms 202*a*, 202*b* working in combination may automatically accomplish the change-over adjustments in less time than a single robotic arm would, although in contemplated examples a single robotic arm could successfully make all of the adjustments required to automatically change-over and reconfigure the machine 200 for a new case blank/carton size. Manual reconfiguration of the machine and associated human error in positioning of the adjustable components and assemblies is beneficially avoided.

Once the change-over adjustments have been made in each half of the machine 200, the robotic arms 202*a*, 202*b* may then return to the overhead location 296 and select the applicable tool for the new size of carton/case blank. When the magazine 206 is loaded with the new size of case blanks, the robotic arms 202*a*, 202*a* may automatically erect cartons from the new case blanks as described above.

FIGS. 9-12 are additional views of the machine 200 from different vantage points and in greater detail showing additional components and accessories in the machine in a contemplated example, some components and accessories of which may be considered optional in other examples. The machine 200 includes protective enclosure elements which may be transparent to ensure the safety of human persons near the machine while the robotic arms 202*a*, 202*a* are operating while still allowing for visual observation or inspection of the machine while operating to erect cartons.

FIG. 13 schematically illustrates the packaging system 100 including the machine 200 and controls therefore and is described in detail above.

FIG. 14 illustrates methodology 400 and process steps implemented by the system 100 and machine 200 described above.

At step 402 the machine 200 is provided, and at step 404 case blanks are provided. Step 402 is a preparatory step including setup of the machine, establishing power supply connection(s) and communication connections, initializing the machine and accepting preferences of machine operators or other industrial systems, and any other action needed to render the machine fully operable. Step 404 includes obtaining a sufficient supply of case blanks to erect the desired number of cases and loading of the machine with a number of blanks to be erected, as well as re-loading of the magazine to continue case erection without interrupting the operation of the machine. Step 404 may also include obtaining an inventory of case blanks of different sizes that are compatible for use with the machine.

At step 406 the magazine is operated to dispense case blanks which may be individually picked by the first robotic arm and removed from the magazine as described above.

At step 410 one or both of the operator arms is operated per the description above to manipulate the case blank to erect a carton by engaging an unfolded case blank to the rail assembly of the machine.

At step 412, the major and minor flaps of the case blank are folded with assistance of the robotic arms and the rail assembly of the machine as described above.

At step 414 the panels of an erected carton are squared, if necessary, per the description above using the side belts provided on the machine and sensed distances to assess the angular orientation of the end panels of the carton.

At step 416 the folded flaps on the bottom of the carton are sealed before the carton is ejected from the machine. Any of the sealing elements above may be utilized for purposes of step 416. At the completion of step 414 or 416 the machine may return to step 406 and dispense another case blank to successively erect cartons.

For each erected carton, at step 418 an article is loaded into the carton per the discussion above.

At step 420 the top carton flaps are folded and at step 422 the top carton flaps are sealed. The packaged article is now ready for shipping at step 424.

At step 426 an instruction for a new case blank/carton size is accepted.

After completion of any carton being erected at the time of receipt of the instruction at step 416, the robotic arm(s) automatically remove the respective erection tools at step 428.

At step 430 the robotic arm(s) proceed to adjust the machine elements described above to accommodate the new case blank/carton size.

At step 432, the robotic arm(s) select the appropriate tool for erecting the new case blank/carton size.

At step 434 the case recipe is accepted for execution by the robotic arm(s) to erect cases from the new case blanks.

Assuming that new case blanks have been loaded in the reconfigured magazine at step 404, a new case blank may be dispensed at step 406.

Using a pre-loaded program, formula, process, or recipe, the robotic arms may automatically change over the machine, without direct user intervention, such that there is no manual change-over required when using case blanks of different size or type. Similarly, a pre-loaded program, formula, process, or recipe cause the robotic arms to undertake the sequence of case erection operations described above and complete the stages of carton erection and processing described in the system and machine. Having described the change-over and case erection and folding stages functionally, it is believed that those in the art could implement the change-over operations, case erection operations, and folding operations in appropriate algorithmic programming for the machine and system and system controls to execute without further explanation.

Equations, formulas or programs may be implemented via a drive controller, to determine the positions of the robotic arms throughout the case forming, allowing for smooth forming while also allowing for easy change-over between different size cases, different types of cases, etc.

The above-described examples or embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the embodiments described above. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Such computer programs (also known as programs, software, software applications, "apps", or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

The applications described above are flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described. Each component and process can also be used in combination with other assembly packages and processes.

One purpose of the present invention is to erect a knock-down style case utilizing robotic arms. The robotic arms also perform all necessary change-over adjustments for the machine. Generally in one or more examples, two robotic arms grab an unformed knock-down case. The robotic arms subsequently erect the case, fold the bottom flaps, and feed the case into side belts for sealing. In one or more examples, the robotic arms also perform all change-over adjustments needed when changing case sizes.

An advantage or benefit of the present invention is utilizing two robotic arms to erect a case allows for the running of right-handed or left-handed cases in the same machine. The machine will also change itself over between sizes of cases.

In an exemplary application, the article 118 may be any one of various types of primary product or carton packaged by the carton 300. In one or more examples, the article 118 is, in turn, used for packaging consumer products. For illustration, the article 118 may be a container. The article 118 may be made from materials suitable in composition for packaging the particular product, such as, but not limited to, aluminum and/or other metals, glass, coated paper board, plastics (e.g., PET, LDPE, LLDPE, HDPE, PP, PS, PVC, EVOH, and Nylon) and the like or any combination thereof. The carton 300, according to the present disclosure, may accommodate the article 150 having any one of various shapes.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

For the purpose of the present disclosure, terms such as "inner," "interior," "outer," "exterior," "lower," "upper," "bottom," "top," "front," "rear," "side" and similar terms or other forms of such terms are relative and refer to an example of a spatial relationship between structures, elements, items, components or features or indicate orientations determined in relation to the machine 200. As such, examples described herein and illustrated in the figures are not intended to be limited by the specific relative terms used to describe any structure, element, item, component or feature of those examples.

The figures, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in the figures, referred to above, need be included in every example and not all elements, features, and/or components described herein are necessarily depicted in each illustrative example. Accordingly, some of the elements, features, and/or components described and illustrated in the figures may be combined in various ways without the need to include other features described and illustrated in the figures, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in the figures, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of the figures, and such elements, features, and/or components may not be discussed in detail herein with reference to each of the figures. Similarly, all elements, features, and/or components may not be labeled in each of the figures, but reference numerals associated therewith may be utilized herein for consistency.

In certain figures, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. Those figures and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples have been shown and described, modifications may occur to those skilled in the art upon reading the specification. The present application includes such modifications and is limited only by the scope of the claims.

The benefits of the inventive concepts are now believed to have been amply illustrated in relation to the exemplary embodiments disclosed.

An example packaging system for erecting a carton from a folded case blank having joined side panels and end panels, and a lower foldable flap respectively depending from each of the side panels and end panels has been disclosed. The system includes a controller in communication with first robotic arm and a second robotic arm; wherein the first robotic arm is configured to engage a first side panel of the folded case blank; wherein the second robotic arm is spaced apart from the first robotic arm and independently controllable from the first robotic arm, the second robotic arm being configured to engage a second side panel of the folded case blank and separate second side panel from the first side panel while erecting the carton; and a rail assembly, wherein the first and second robotic arms are configured to engage the lower foldable flaps to the rail assembly in a manner that automatically causes a first opposed pair of the lower foldable flaps to fold in sequence before a second opposed pair of the lower foldable flaps are automatically folded, thereby closing a lower side of the erected carton.

Optionally, the lower foldable flaps may include a leading end flap and a trailing end flap when placed on the rail assembly, the first and second robotic arms and the rail assembly causing the trailing end flap to fold before the leading end flap. The lower foldable flaps may further include a pair of longitudinal flaps, and the rail assembly may include at least one actuator automatically folding at least one of the longitudinal flaps as the erected carton is moved along the rail assembly by at least one of the first and second robotic arms. The rail assembly may include at least one element to keep the trailing flap from unfolding as the erected carton is moved along the rail assembly by at least one of the first and second robotic arms.

The system may optionally include a magazine receiving a number of folded case blanks, wherein only the first robotic arm may engage an outermost one of the number of folded case blanks in the magazine in order to remove the outermost one of the number of folded case blanks from the magazine. The second robotic arm may engage the second side panel only after the outermost one of the folded case blanks is entirely removed from the magazine by the first robotic arm. The first robotic arm may include a tool configured to attach partly to the first side panel and also to attach partly to the lower foldable flap depending from the first side panel, whereby the tool maintains the first side panel and the lower foldable flap in a coplanar relationship for placement onto the rail assembly. The magazine may include a static stop and a driven stop to facilitate a removal of a folded case blank from the magazine.

The system may optionally include a magazine having a first side wall, a second side wall and at least one conveyor assembly located between the first and second side wall; and wherein a relative position of the first side wall, the second side wall and the at least one conveyor assembly is adjustable to receive a number of folded case blanks of respectively different size. At least one of the first robotic arm and the second robotic arm may be configured to automatically adjust the relative position of the first side wall, the second side wall and the at least one conveyor assembly in the magazine. The magazine may further include at least one brake assembly to maintain a selected position of the first side wall, the second side wall and the at least one conveyor assembly in the magazine. At least one brake assembly may include a spring-loaded air cylinder. At least one conveyor assembly may include a rotatably mounted cylinder, a rotatable link, and a conveyor belt.

The system may further include a first side belt and a second side belt operable to square the side panels and end panels of the erected carton. At least one sensor may be configured to detect an angular orientation of at least one of the end panels, and a speed of at least one of the first side belt and the second side belt is adjustable to square the joined panels to extend orthogonally to one another in response to the detected angular orientation. The first side belt and the second side belt may be adjustably positionable relative to one another. At least one of the first robotic arm and the second robotic arm may be configured to automatically adjust a relative position of the first side belt and the second side belt. At least one brake assembly may be provided to maintain a position of the first side belt and the second side belt.

A set of tools may be provided in the system and may be selectively connectable to the first robotic arm and the second robotic arm for respectively erecting differently dimensioned case blanks. Each tool in the set of tools may include a plate and a number of vacuum cups supported by the plate to engage the case blank.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A packaging system for erecting a carton from a folded case blank having joined side panels and end panels, and a lower foldable flap respectively depending from each of the side panels and end panels, the system comprising:

a first robotic arm comprising a multi-axis arm and mounted to a frame at an upper extremity thereof;

a second robotic arm comprising a multi-axis arm and mounted to the frame at an upper extremity thereof at a position spaced from the first robotic arm;

a controller in communication with the first robotic arm and the second robotic arm;

wherein the first robotic arm is configured to engage a first side panel of the folded case blank;

wherein the second robotic arm is spaced apart from the first robotic arm and independently controllable from the first robotic arm, the second robotic arm being configured to engage a second side panel of the folded case blank and separate second side panel from the first side panel while erecting the carton; and a rail assembly, wherein the first and second robotic arms are configured to engage the lower foldable flaps to the rail assembly in a manner that automatically causes a first opposed pair of the lower foldable flaps to fold in sequence before a second opposed pair of the lower foldable flaps are automatically folded, thereby closing a lower side of the erected carton.

2. The system of claim 1, wherein the first opposed pair of the lower foldable flaps include a leading end flap and a trailing end flap when placed on the rail assembly, the first and second robotic arms and the rail assembly causing the trailing end flap to fold before the leading end flap.

3. The system of claim 2, wherein the second pair of lower foldable flaps further include a pair of longitudinally extending major flap panels extending from first and the second side panels respectively, and wherein the rail assembly includes at least one actuator automatically folding at least one of the longitudinally extending major flap panels as the erected carton is moved along the rail assembly by at least one of the first and second robotic arms.

4. The system of claim 2, wherein the rail assembly includes at least one element to keep the trailing flap from unfolding as the erected carton is moved along the rail assembly by at least one of the first and second robotic arms.

5. The system of claim 1, further comprising a magazine receiving a number of folded case blanks, wherein only the first robotic arm engages an outermost one of the number of folded case blanks in the magazine in order to remove the outermost one of the number of folded case blanks from the magazine.

6. The system of claim 5, wherein the second robotic arm engages the second side panel only after the outermost one of the folded case blanks is entirely removed from the magazine by the first robotic arm.

7. The system of claim 5, wherein the first robotic arm includes a tool configured to attach partly to the first side panel and also to attach partly to the lower foldable flap depending from the first side panel, whereby the tool maintains the first side panel and the lower foldable flap in a coplanar relationship for placement onto the rail assembly.

8. The system of claim 5, wherein the magazine further includes a static stop and a driven stop to facilitate a removal of a folded case blank from the magazine.

9. The system of claim 1, further comprising:

a magazine including a first side wall, a second side wall and at least one conveyor assembly located between the first and second side wall; and wherein a relative position of the first side wall, the second side wall and the at least one conveyor assembly is adjustable to receive a number of folded case blanks of respectively different size.

10. The system of claim 9, wherein at least one of the first robotic arm and the second robotic arm is configured to automatically adjust the relative position of the first side wall, the second side wall and the at least one conveyor assembly in the magazine.

11. The system of claim 9, wherein the magazine further includes at least one brake assembly to maintain a selected position of the first side wall, the second side wall and the at least one conveyor assembly in the magazine.

12. The system of claim 11, wherein the at least one brake assembly includes a spring-loaded air cylinder.

13. The system of claim 9, wherein the at least one conveyor assembly includes a rotatably mounted cylinder, a rotatable link, and a conveyor belt.

14. The system of claim 1, further comprising a first side belt and a second side belt operable to square the side panels and end panels of the erected carton.

15. The system of claim 14, further comprising at least one sensor configured to detect an angular orientation of at least one of the end panels, and a speed of at least one of the first side belt and the second side belt being adjustable to square the joined panels to extend orthogonally to one another in response to the detected angular orientation.

16. The system of claim 14, wherein the first side belt and the second side belt are adjustably positionable relative to one another.

17. The system of claim 16, wherein at least one of the first robotic arm and the second robotic arm is configured to automatically adjust a relative position of the first side belt and the second side belt.

18. The system of claim 17, further comprising at least one brake assembly to maintain a position of the first side belt and the second side belt.

19. The system of claim 1, further comprising a set of tools selectively connectable to the first robotic arm and the second robotic arm for respectively erecting differently dimensioned case blanks.

20. The system of claim 19, wherein each tool in the set of tools includes a plate and a number of vacuum cups supported by the plate to engage the case blank.

* * * * *